US008913253B2

(12) United States Patent
Kiyose

(10) Patent No.: US 8,913,253 B2
(45) Date of Patent: Dec. 16, 2014

(54) OPTICAL POSITION DETECTION APPARATUS AND APPLIANCE HAVING POSITION DETECTION FUNCTION

(75) Inventor: Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 667 days.

(21) Appl. No.: 13/188,686

(22) Filed: Jul. 22, 2011

(65) Prior Publication Data

US 2012/0033233 A1 Feb. 9, 2012

(30) Foreign Application Priority Data

Aug. 4, 2010 (JP) .................................. 2010-175121

(51) Int. Cl.
*G01B 11/14* (2006.01)
*G01B 11/03* (2006.01)

(52) U.S. Cl.
CPC .................................. *G01B 11/03* (2013.01)
USPC ...................................................... 356/615

(58) Field of Classification Search
USPC .......................................... 356/614–625, 445
See application file for complete search history.

(56) References Cited

U.S. PATENT DOCUMENTS 6,953,926 B2 10/2005 Reime
7,786,983 B2 * 8/2010 Graham ........................ 345/175
8,259,309 B2 * 9/2012 Kiyose ........................... 356/614
2003/0155487 A1 * 8/2003 Reime ........................... 250/221
2005/0236481 A1 * 10/2005 Gascoyne et al. ............. 235/454
2009/0135162 A1 * 5/2009 Van De Wijdeven et al. 345/175
2009/0295744 A1 * 12/2009 Onishi ............................ 345/173
2010/0020334 A1 * 1/2010 Nakanishi ..................... 356/614
2010/0321339 A1 * 12/2010 Kimmel ........................ 345/175
2011/0128554 A1 * 6/2011 Nakanishi ..................... 356/621

FOREIGN PATENT DOCUMENTS

JP      62-46207 A      2/1987
JP      2003-534554     11/2003
WO      WO01/90770      11/2001

* cited by examiner

*Primary Examiner* — Kara E Geisel
*Assistant Examiner* — Dominic J Bologna
(74) *Attorney, Agent, or Firm* — Harness, Dickey & Pierce, P.L.C.

(57) ABSTRACT

An optical position detection apparatus detects the position of a target object in a Z-axis direction and the position of the target object in an X-axis direction based on the result of the light reception in a light receiving unit when light source units that are spaced apart in the X-axis direction are sequentially turned on and the result of the light reception in the light receiving unit when light source units that are spaced apart in the Z-axis direction are sequentially turned on among a first light source unit, a second light source unit, and a third light source unit. The emission directions of the detection lights in the first light source unit, the second light source unit, and the third light source unit are equal to one another in the Z-axis direction.

16 Claims, 18 Drawing Sheets

OPTICAL POSITION DETECTION APPARATUS AND APPLIANCE HAVING POSITION DETECTION FUNCTION

BACKGROUND

1. Technical Field

The present invention relates to an optical position detection apparatus optically detecting the position of a target object and an appliance having a position detection function provided with the optical position detection apparatus.

2. Related Art

An optical position detection apparatus optically detecting a target object has been proposed, in which, for example, a first light source unit and a second light source unit emit detection light toward the target object, and a light receiving unit detects the detection light that is reflected from the target object. According to this optical position detection apparatus, the first light source unit and the second light source unit are arranged to be in the same position in a first direction in which detection lights are emitted and to be spaced apart from each other in a second direction that crosses the emission direction (first direction) of the detection light. According to the result of the detection in the light receiving unit when the first light source unit and the second light source unit are sequentially turned on, the position of the target object in the second direction can be detected (for example, see JP-T-2003-534554).

However, according to the configuration described in JP-T-2003-534554, the first light source unit and the second light source unit are installed in the same position in the first direction, and thus the position of the target object in the first direction (the emission direction of the detection light) cannot be detected. In FIG. 2 of JP-T-2003-534554, a configuration is disclosed, in which a third light source unit that emits a detection light in an inclined direction against the emission direction of the detection lights from two light source units is additionally provided. However, even in such a configuration, it is difficult to detect the position of the target object in a wide range in the emission direction of the detection lights from the first light source unit and the second light source unit.

SUMMARY

An advantage of some aspects of the invention is to provide an optical position detection apparatus which can detect the position of a target object in a first direction and a second direction that crosses the first direction, in which detection lights are emitted, in a wide range in the same principle, and an appliance having a position detection function provided with the optical position detection apparatus.

According to an aspect of the invention, there is provided an optical position detection apparatus optically detecting the position of a target object, which includes a first light source unit emitting a detection light from one side to the other side in a first direction; a second light source unit emitting a detection light from the one side to the other side in the first direction in a position that is spaced apart from the first light source unit in a second direction that crosses the first direction; a third light source unit emitting a detection light from the one side to the other side in the first direction in a position that is spaced apart from the first light source unit and the second light source unit to the one side in the corresponding first direction; a light receiving unit receiving the detection lights that are reflected by the target object positioned in an emission space of the detection lights; a light source drive unit driving the first light source unit, the second light source unit, and the third light source unit; a light receiving unit receiving the detection lights that are reflected by the target object positioned in the emission space of the detection lights; and a position detection unit detecting the position of the target object in the first direction and the position of the target object in the second direction in the emission space based on the result of the light reception in the light receiving unit when the light source drive unit sequentially turns on the light source units that are spaced apart in the second direction among the first light source unit, the second light source unit and the third light source unit and the result of the light reception in the light receiving unit when the light source drive unit sequentially turns on the light source units that are spaced apart in the first direction.

According to the aspect of the invention, the result of the light reception in the light receiving unit when the light source units that are spaced apart in the second direction among the first light source unit, the second light source unit, and the third light source unit are sequentially turned on corresponds to a distance that is measured from the light source unit to the light receiving unit through the target object. Accordingly, the position information of the target object in the second direction can be detected by directly using the result of the detection in the light receiving unit or using the drive current when differential of the light source units is made based on the result of the light reception in the light receiving unit. Further, the result of the light reception in the light receiving unit when the light source units that are spaced apart in the first direction among the first light source unit, the second light source unit, and the third light source unit are sequentially turned on corresponds to a distance that is measured from the light source unit to the light receiving unit through the target object. Accordingly, the position information of the target object in the first direction can be detected by directly using the result of the detection in the light receiving unit or using the drive current when differential of the light source units is made based on the result of the light reception in the light receiving unit. That is, the position information of the target object in the direction (first direction) in which the detection lights are emitted from the first light source unit, the second light source unit, and the third light source unit can be detected. Because of this, according to the position information obtained when the light source units that are spaced apart in the second direction are sequentially turned on and the position information obtained when the light source units that are spaced apart in the first direction are sequentially turned on, the position of the target object in the first direction and the position of the target object in the second direction can be detected, and thus the optical position detection apparatus can be used as an input device or the like. Here, the emission directions of the detection lights in the first light source unit, the second light source unit, and the third light source unit are equal to one another in the first direction. Accordingly, the position of the target object can be detected over a wide range in the emission direction (first direction) of the detection lights.

According to the aspect of the invention, it is preferable that the third light source unit is positioned within a plane that expands in the first direction and in the second direction through the first light source unit and the second light source unit. According to this configuration, the position of the target object in the first and second directions can be detected without being affected by the position of the target object in a third direction that crosses both the first direction and the second direction.

According to the aspect of the invention, the light source drive unit may be configured to sequentially turn on the first light source unit and the second light source unit in sequentially turning on the light source units that are spaced apart in the second direction and to sequentially turn on the first light source unit and the third light source unit in sequentially turning on the light source units that are spaced apart in the first direction.

According to the aspect of the invention, the first light source unit and the second light source unit may be installed in the same position in the first direction, and the light source drive unit may be configured to sequentially turn on the first light source unit and the second light source unit in sequentially turning on the light source units that are spaced apart in the second direction, and to simultaneously turn on the first light source unit and the second light source unit with the same luminance and to sequentially turn on the third light source unit, the first light source unit, and the second light source unit in sequentially turning on the light source units that are spaced apart in the first direction.

According to the aspect of the invention, the optical position detection apparatus may further include a fourth light source unit that emits a detection light from one side to the other side in the first direction in the same position as the third light source unit in the corresponding first direction, wherein the light source drive unit simultaneously turns on the fourth light source unit with the same luminance as the third light source unit when it sequentially turns on the light source units that are spaced apart in the first direction.

According to the aspect of the invention, it is preferable that the light source drive unit makes a differential of the light source units that are spaced apart in the second direction so that their light intensities in the light receiving unit become equal to each other when the corresponding light source units are sequentially turned on, and makes a differential of the light source units that are spaced apart in the first direction so that their light intensities in the light receiving unit become equal to each other when the corresponding light source units are sequentially turned on. In the case of using such a differential, the influence of an ambient light or the like can be automatically corrected.

According to the aspect of the invention, the optical position detection apparatus may further include a reference light source which emits a reference light that is incident to the light receiving unit without passing through the emission space, wherein the light source drive unit makes a differential of the light source units that are spaced apart in the second direction and the reference light source so that their light intensities in the light receiving unit become equal to each other when the corresponding light source units are sequentially turned on, and makes a differential of the light source units that are spaced apart in the first direction and the reference light source so that their light intensities in the light receiving unit become equal to each other when the corresponding light source units are sequentially turned on. In the case of using such a differential, the influence of an ambient light or the like can be automatically corrected.

The optical position detection apparatus to which the invention is applied may be used in an appliance having a position detection function provided with a visible surface configuration member having a visible surface. In this case, any one of a configuration where the detection light is emitted along the visible surface and a configuration where the detection light is emitted to transmit the visible surface may be adopted.

According to the aspect of the invention, as the visible surface configuration member, a direct-view image generation device that displays an image may be used, and in this case, the visible surface may be an image display surface in which the image is displayed in the direct-view image generation device. According to this configuration, the appliance having the position detection function may include a direct-view display device having a position detection function.

According to the aspect of the invention, as the visible surface configuration member, a screen on which information is visible may be used, and in this case, the visible surface may be a screen surface on which the information is visible. In the screen, according to this configuration, the appliance having the position detection function may include a position detection function equipped screen device.

According to the aspect of the invention, as the visible surface configuration member, a light receiving member for covering an exhibit may be used. In this case, the visible surface is a surface on which the corresponding exhibit is visible on the opposite side to the side where the exhibit is arranged in the visible surface configuration member. According to this configuration, the appliance having the position detection function may include a show window or the like having the position detection function.

According to the aspect of the invention, as the visible surface configuration member, a configuration having a base that supports a moving medium for a game may be adopted, and in this case, the visible surface is a surface on the side where the medium for a game is visible in the base. According to this configuration, the appliance having the position detection function may include an amusement appliance such as a pachinko (Japanese pinball) machine and a coin game.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the accompanying drawings. In the following description, it is assumed that axes crossing one another in opposite directions are X-axis, Y-axis, and Z-axis, and an emission direction of detection light is a Z-axis direction. Accordingly, according to an embodiment of the invention, a "first direction" is a Z-axis direction, a "second direction" crossing the "first direction" is an X-axis direction. Further, in the following reference drawings, it is assumed that one side in the X-axis direction is an X1 side, the other side therein is X2 side, one side in the Y-axis direction is a Y1 side, the other side therein is Y2 side, one side in the Z-axis direction is a Z1 side, and the other side therein is Z2 side.

Embodiment 1

Entire Configuration

Figure 1A:
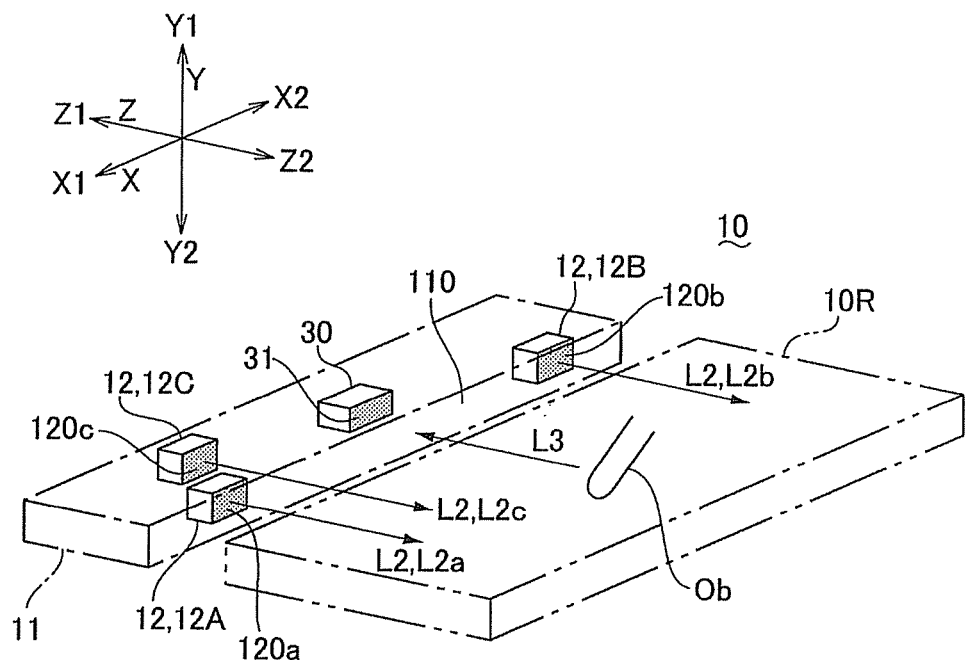
FIGS. 1A to 1C are explanatory views schematically illustrating a main portion of an optical position detection apparatus according to embodiment 1 of the invention.
Figure 1B:
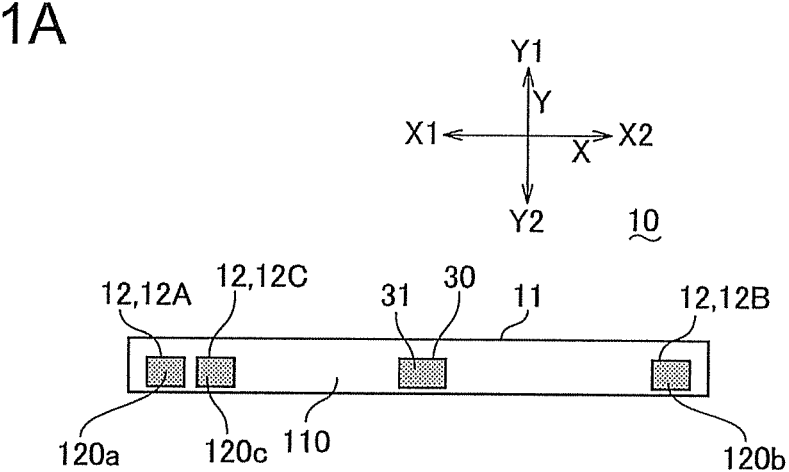
Figure 1C:
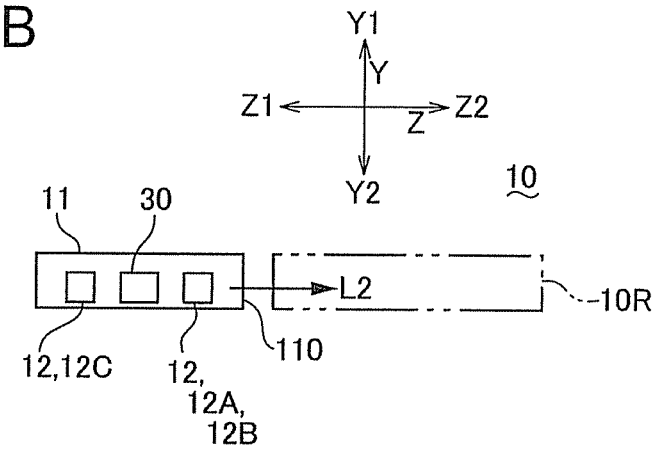
Figure 2:
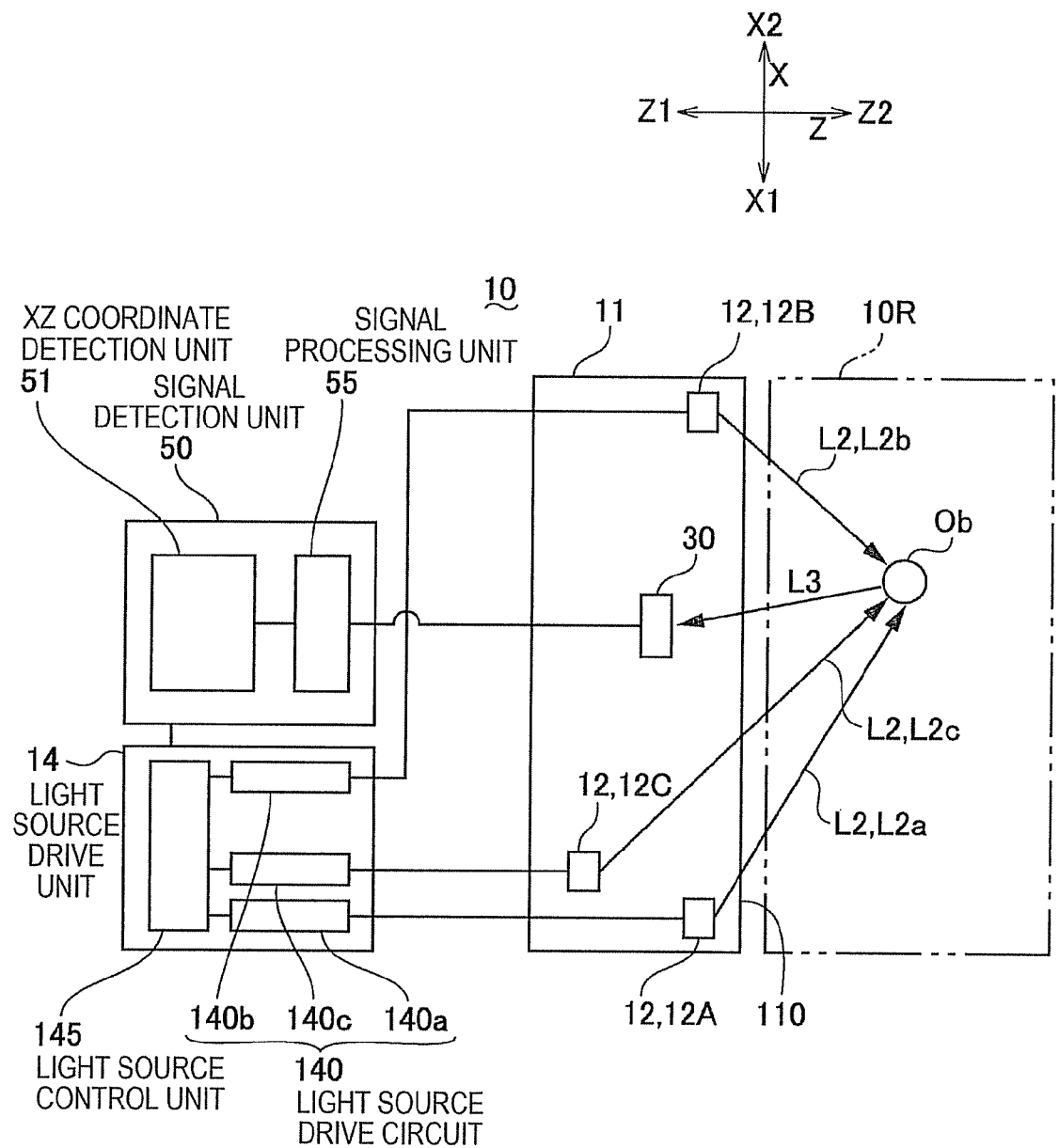
FIG. 2 is an explanatory diagram illustrating the entire configuration of an optical position detection apparatus according to embodiment 1 of the invention.

FIGS. 1A to 1C are explanatory views schematically illustrating a main portion of an optical position detection apparatus according to embodiment 1 of the invention, in which FIG. 1A is an explanatory view illustrating a three-dimensional arrangement of light source units and the like in the optical position detection apparatus, FIG. 1B is an explanatory view illustrating light source units and the like as seen on the other side in the Z-axis direction, and FIG. 1C is an explanatory view illustrating light source units and the like as seen in the X-axis direction. FIG. 2 is an explanatory diagram illustrating the entire configuration of an optical position detection apparatus according to embodiment 1 of the invention, and illustrates light source units and the like as seen in the Y-axis direction.

In FIGS. 1A to 1C and 2, the optical position detection apparatus 10 according to this embodiment includes an optical unit 11 having a light emission surface 110 that emits a detection light L2 from one side Z1 to the other side Z2 in the Z-axis direction (first direction). This optical unit 11 includes a plurality of light source units 12 emitting the detection lights L2 from one side Z1 to the other side Z2 in the Z-axis direction, and a light receiving unit 30 detecting a detection light L3 reflected from a target object Ob.

The optical unit 11 is provided with three or more light source units as the plurality of light source units 12. In this embodiment, the three light source units 12 include a first light source unit 12A, a second light source unit 12B which is installed in a position that is spaced apart from the first light source unit 12A in the X-axis direction (second direction) crossing the Z-axis direction, and a third light source unit 12C which is installed in a position that is spaced apart from the first light source unit 12A and the second light source unit 12B to one side Z1 in the Z-axis direction. The first light source unit 12A, the second light source unit 12B, and the third light source unit 12C emit detection lights L2a, L2b, and L2c, respectively, as the detection lights L2. Further, in the first light source unit 12A, the second light source unit 12B, and the third light source unit 12C, light emitting portions 120a to 120c are directed to the other side Z2 in the Z-axis direction, and the optical axes of the first light source unit 12A, the second light source unit 12B, and the third light source unit 12C are in parallel with one another. In this embodiment, a detection space 10R in which the position of the target object Ob is detected is formed by an emission space of the detection light L2 as described above.

Here, the first light source unit 12A and the second light source unit 12B are arranged in the same position in the Z-axis direction. Also, the third light source unit 12C is arranged in a position that is shifted from one side Z1 in the Z-axis direction to the other side X2 in the X-axis direction with respect to the first light source unit 12A. Due to this, the third light source unit 12C is positioned on one side Z1 in the Z-axis direction as seen from a light emission surface 110 in comparison to the first light source unit 12A and the second light source unit 12B. Further, the third light source unit 12C is positioned within an XZ plane that expands in the Z-axis direction and in the X-axis direction through the first light source unit 12A and the second light source unit 12B.

In this embodiment, the light source units 12 (the first light source unit 12A, the second light source unit 12B, and the third light source unit 12C) are all configured by light emitting elements such as LED (Light Emitting Diodes), and in this embodiment, the light source units 12 emit the detection lights L2 (detection lights L2a and Lbc) which is composed of infrared lights having a peak wavelength of 840 to 1000 nm as diverging lights. In this embodiment, since the target object Ob is a finger end or the like in many cases, infrared lights (near infrared lights of about 840 to 920 nm) of a wavelength region having a high reflection rate on the target object Ob (human body) are used as the detection lights L2.

The light receiving unit 30 is composed of a photodiode or a phototransistor that is directed toward a light receiving surface 31 on the other side Z2 in the Z-axis direction, and in this embodiment, the light receiving unit 30 is a photodiode having a peak sensitivity of an infrared region. In this embodiment, the light receiving unit 30 is arranged approximately in the center position between the first light source unit 12A and the second light source unit 12B in the X-axis direction, and is arranged approximately in the center position between the first and second light source units 12A and 12B and the third light source unit 12C in the Z-axis direction. Due to this, the light receiving unit 30 is positioned on one side Z1 in the Z-axis direction as seen from the light emission surface 110 in comparison to the first light source unit 12A and the second light source unit 12B.

Configuration of a Position Detection Unit or the Like

As illustrated in FIG. 2, the unit 11 is provided with a light source drive unit 14 that drives a plurality of light source units 12. The light source drive unit 14 includes a light source drive circuit 140 driving the light source units 12 and a light source control unit 145 controlling turning-on of the plurality of light source units 12 through the light source drive circuit 140. The light source drive circuit 140 includes light source drive circuits 140a to 140c driving the first light source unit 12A to the third light source unit 12C, and the light source control unit 145 controls all the light source drive circuits 140a to 140c.

The light receiving unit 30 is electrically connected to a position detection unit 50, and the light receiving unit 30 outputs the result of the detection to the position detection unit 50. The position detection unit 50 includes a signal processing unit 55 (signal processing circuit) for performing signal process for detecting the position of the target object Ob based on the result of the detection in the light receiving unit 30, and the signal processing unit 55 includes an amplifier, a comparator, and the like. Further, the position detection unit 50 includes an XZ coordinate detection unit 51 detecting the position in the X-axis direction and the position in the Z-axis direction of the target object Ob in the detection space 10R (emission space) based on the result of the light reception in the light receiving unit 30 when the plurality of light source units 12 are sequentially turned on in a pre-installed pattern.

The position detection unit 50 and the light source drive unit 14 as configured above operate in conjunction with each other, and perform position detection to be described later. In the position detection unit 50, a microprocessor unit (MPU) is used as the XZ coordinate detection unit 51, and thus a configuration that performs the process according to execution of predetermined software (operation program) may be adopted.

Basic Principle for Detecting Coordinates

In the optical position detection apparatus 10 in this embodiment, the position detection unit 50 detects the X coordinates and Z coordinates of the target object Ob in the detection space 10R based on the result of the light reception in the light receiving unit 30 when the light source units 12 that are spaced apart in the X-axis direction among the plurality of light source units 12 (the first light source unit 12A, the second light source unit 12B, and the third light source unit 12C) are sequentially turned on and the result of the light reception in the light receiving unit 30 when the light source units 12 that are spaced apart in the Z-axis direction are sequentially turned on. In this case, the position detection unit 50 obtains the ratio of the distance between one light source unit 12 of the two light source unit 12 and the target object Ob to the distance between the other light source unit 12 and the target object Ob, and detects the position of the target object Ob based on a geometric line that is set based on the two light source units 12 corresponding to the ratio.

More specifically, in sequentially turning on the light source units 12 that are spaced apart in the X-axis direction, the light source drive unit 14 turns on the first light source unit 12A, but turns off the second light source unit 12B and the third light source unit 12C. Further, the light source drive unit 14 turns off the first light source unit 12A and the third light source unit 12C, but turns on the second light source unit 12B. Accordingly, if the target object Ob is arranged in the detection space 10R, the detection light L2 is reflected by the target object Ob, and a part of the reflected light is detected by the light receiving unit 30. At that time, the light intensity in the light receiving unit 30 has a value that corresponds to the position of the target object Ob. Accordingly, by using the ratio of the drive current when the control amount (drive current) of the first light source unit 12A is adjusted to the drive current when the control amount (drive current) of the second light source unit 12B is adjusted or the ratio of the adjustment amounts so that the light intensity of the light receiving unit 30 when the first light source unit 12A is turned on becomes equal to the light intensity of the light receiving unit 30 when the second light source unit 12B is turned on, a geometric line that is based on the first light source unit 12A and the second light source unit 12B in the XZ plane can be set, and the target object Ob is positioned on such a geometric line.

Further, in sequentially turning on the light source units 12 that are spaced apart in the Z-axis direction, the light source drive unit 14 turns on the first light source unit 12A, but turns off the second light source unit 12B and the third light source unit 12C. Further, the light source drive unit 14 turns off the first light source unit 12A and the second light source unit 12B, but turns on the third light source unit 12C. Accordingly, if the target object Ob is arranged in the detection space 10R, the detection light L2 is reflected by the target object Ob, and a part of the reflected light is detected by the light receiving unit 30. At that time, the light intensity in the light receiving unit 30 becomes a value that corresponds to the position of the target object Ob. Because of this, by using the ratio of the drive current when the control amount (drive current) of the first light source unit 12A to the drive current when the control amount (drive current) of the third light source unit 12C or the ratio of the adjusted amounts so that the light intensity of the light receiving unit 30 when the first light source unit 12A is turned on becomes equal to the light intensity of the light receiving unit 30 when the third light source unit 12C is turned on, a geometric line can be set based on the first light source unit 12A and the third light source unit 12C in the XZ plane, and the target object Ob is positioned on such a geometric line.

Accordingly, by obtaining an intersection point of the geometric line obtained by performing a differential of the first light source unit 12A and the second light source unit 12B and the geometric line obtained by performing a differential of the first light source unit 12A and the third light source unit 12C, the position (XY coordinates) of the target object Ob can be obtained.

The geometric line as described above can be acquired by focusing on a distance function in that the detection light L2 emitted from the light source unit 12 is reflected by the target object Ob and reaches the light receiving unit 30, and an acquisition method thereof will be described hereinafter. First, the first light source unit 12A and the second light source unit 12B are alternately turned on. In this case, it is assumed that respective parameters are as follows.

T=the reflection rate of a target object Ob $A_f$=a distance function in that the detection light L2a emitted from the first light source unit 12A is reflected by the target object Ob and reaches the light receiving unit 30

A=the detected intensity of the light receiving unit 30 when the first light source unit 12A is turned on in a state where the target object Ob is present in the detection space 10R $B_t$=a distance function in that the detection light L2b emitted from the second light source unit 12B is reflected by the target object Ob and reaches the light receiving unit 30

B=the detected intensity of the light receiving unit 30 when the second light source unit 12B is turned on in a state where the target object Ob is present in the detection space 10R In this case, although the emission intensities of the first light source unit 12A and the second light source unit 12B are expressed by multiplications of the drive current and the emission coefficient, it is assumed that the emission coefficient is "1" in the following description. Further, in the above-described differential, it is assumed that the drive current of the first light source unit 12A when the light intensities in the light receiving unit 30 become equal to each other is $I_A$, and the drive current of the second light source unit 12B is $I_B$.

By performing the above-described differential in a state where the target object Ob is present in the detection space 10R, the following relationship is obtained.

$$A = T \times A_t \times I_A + \text{ambient light} \quad \text{Equation (1)}$$

$$B = T \times B_t \times I_B + \text{ambient light} \quad \text{Equation (2)}$$

Here, since the detection intensities in the light receiving unit 30 are the same during the differential, the following equation is derived from the equations (1) and (2).

$$T \times A_t \times I_A + \text{ambient light} = T \times B_t \times I_B + \text{ambient light}$$

$$T \times A_t \times I_A = T \times B_t \times I_B \quad \text{Equation (3)}$$

Further, since the ratio $P_{AB}$ of the distance functions $A_t$ and $B_t$ is defined by the following equation (4), the ratio $P_{AB}$ of the distance functions is expressed as the following equation (5) from the equations (3) and (4).

$$P_{AB} = A_t/B_t \quad \text{Equation (4)}$$

$$P_{AB} = I_B/I_A \quad \text{Equation (5)}$$

In the equation (5), the term "ambient light" and the term "reflection rate of the target object Ob" do not exist. Because of this, the ratio $P_{AB}$ of the distance functions $A_t$ and $B_t$ is not influenced by the ambient light and the reflection rate of the target object Ob. In this case, with respect to the above-described mathematical models, a correction for offsetting the influence of the detection light L2 that is incident without being reflected by the target object Ob may be performed.

Here, the light source unit 12 is a point light source, and the light intensity at a certain point is in inverse proportion to a square of the distance from the light source. Accordingly, the ratio of the distance $P_1$ that is measured from the first light source unit 12A to the light receiving unit 30 through the target object Ob to the distance $P_2$ that is measured from the second light source unit 12B to the light receiving unit 30 through the target object Ob is obtained by the following equation.

$$P_{AB} = (P_1)^2 : (P_2)^2$$

Accordingly, a geometric line that corresponds to the ratio of $P_1:P_2$ can be set based on the first light source unit 12A and the second light source unit 12B in the XZ plane, and the target object Ob is positioned on such a geometric line.

In the same manner, if the ratio of the distance that is measured from the first light source unit 12A to the light receiving unit 30 through the target object Ob to the distance that is measured from the third light source unit 12C to the light receiving unit 30 through the target object Ob is obtained by making a differential of the first light source unit 12A and the third light source unit 12C, the geometric line can be set based on the first light source unit 12A and the third light source unit 12C in the XZ plane, and the target object Ob is positioned on the geometric line.

Accordingly, by obtaining an intersection point of the geometric line obtained by performing a differential of the first light source unit 12A and the second light source unit 12B and the geometric line obtained by performing a differential of the first light source unit 12A and the third light source unit 12C, the position (XZ coordinates) of the target object Ob can be obtained.

Main Effect of this Embodiment

As described above, according to the optical position detection apparatus 10 in this embodiment, the result of the light reception in the light receiving unit 30 when the light source units 12 that are spaced apart in the X-axis direction among the first light source unit 12A, the second light source unit 12B, and the third light source unit 12C are sequentially turned on corresponds to a distance that is measured from the light source unit 12 to the light receiving unit 30 through the target object Ob. Accordingly, the position information of the target object Ob in the X-axis direction can be detected by directly using the result of the detection in the light receiving unit 30 or using the drive current when a differential of the light source units 12 is made based on the result of the light reception in the light receiving unit 30. Further, the result of the light reception in the light receiving unit 30 when the light source units 12 that are spaced apart in the Z-axis direction among the first light source unit 12A, the second light source unit 12B, and the third light source unit 12C are sequentially turned on corresponds to a distance that is measured from the light source unit 12 to the light receiving unit 30 through the target object Ob. Accordingly, the position information of the target object Ob in the Z-axis direction can be detected by directly using the result of the detection in the light receiving unit 30 or using the drive current when a differential of the light source units 12 is made based on the result of the light reception in the light receiving unit 30. That is, the position information of the target object Ob in the direction (Z-axis direction) in which the detection lights L2 are emitted from the first light source unit 12A, the second light source unit 12B, and the third light source unit 12C can be detected. Because of this, according to the position information obtained when the light source units 12 that are spaced apart in the X-axis direction are sequentially turned on and the position information obtained when the light source units 12 that are spaced apart in the Z-axis direction are sequentially turned on, the position of the target object Ob in the Z-axis direction and the position of the target object in the X-axis direction can be detected, and thus the optical position detection apparatus 10 can be used as an input device or the like.

Here, the emission directions of the detection lights L2 in the first light source unit 12A, the second light source unit 12B, and the third light source unit 12C are equal to one another in the Z-axis direction. Accordingly, the position of the target object Ob can be detected over a wide range in the emission direction (Z-axis direction) of the detection lights L.

Further, the third light source unit 12C is positioned within the XZ plane that expands in the Z-axis direction and in the X-axis direction through the first light source unit 12A and the second light source unit 12B. Accordingly, the position of the target object Ob in the Z-axis and X-axis directions can be detected without being affected by the position of the target object Ob in the Y-axis direction that crosses both the Z-axis direction and the X-axis direction.

Further, in this embodiment, since the differential of two light source units 12 is used, the influence of an ambient light or the like can be automatically corrected.

Further, since the detection light L2 is an infrared light, it is not visible. Accordingly, in a case of displaying information on an appliance on which the optical position detection apparatus 10 in this embodiment is mounted, the detection light does not disturb the visibility of the information.

Modified Example of Embodiment 1

In embodiment 1 as described above, the light source drive unit 14 alternately turns on the first light source unit 12A and the second light source unit 12B in sequentially turning on the light source units 12 that are spaced apart in the X-axis direction, and alternately turns on the first light source unit 12A and the third light source unit 12C in sequentially turning on the light source units 12 in the Z-axis direction.

However, in this embodiment, the light source drive unit 14 alternately turns on the first light source unit 12A, the second light source unit 12B, and the third light source unit 12C in sequentially turning on the light source units 12 that are spaced apart in the Z-axis direction. More specifically, the light source drive unit 14 repeats an operation of simultaneously turning on the first light source unit 12A and the second light source unit 12B with the same luminance and turning off the third light source unit 12C and an operation of turning off the first light source unit 12A and the second light source unit 12B and turning on the third light source unit 12C in sequentially turning on the light source units 12 that are spaced apart in the Z-axis direction. In this case, the light source drive unit 14 alternately turns on the first light source unit 12A and the second light source unit 12B in sequentially turning on the light source units 12 that are spaced apart in the X-axis direction.

According to the above-described configuration, since the first light source unit 12A and the second light source unit 12B are simultaneously turned on with the same luminance when the position information of the target object Ob in the Z-axis direction is obtained, the detection lights L2 can be emitted over a wide range in the X-axis direction and in the Z-axis direction. Accordingly, the position of the target object Ob can be detected over a wide range in the X-axis direction and in the Z-axis direction.

Embodiment 2

Figure 3A:
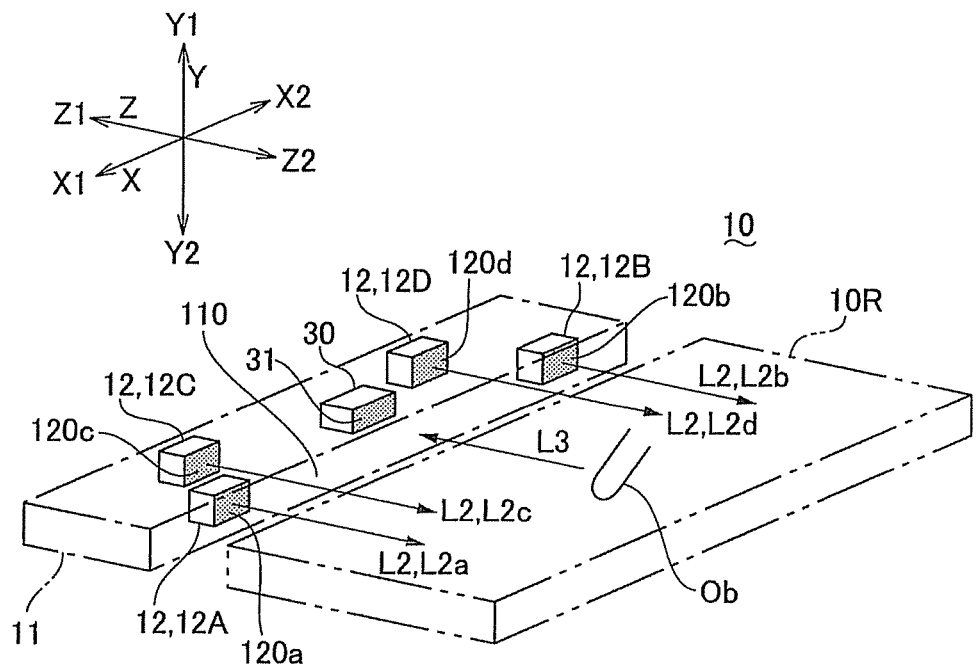
FIGS. 3A to 3C are explanatory views schematically illustrating a main portion of an optical position detection apparatus according to embodiment 2 of the invention.
Figure 3B:
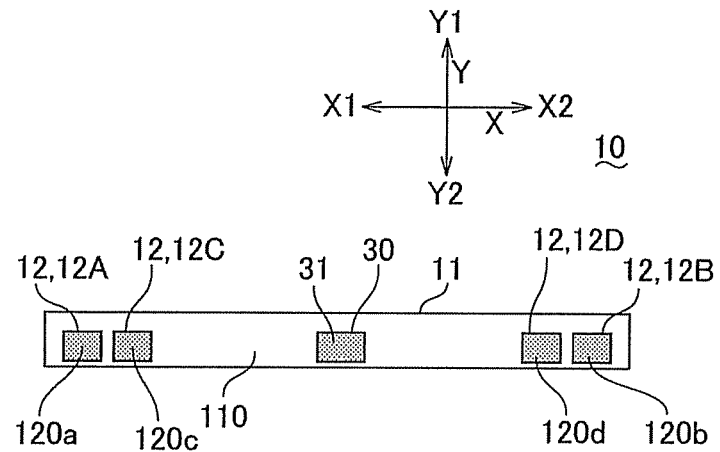
Figure 3C:
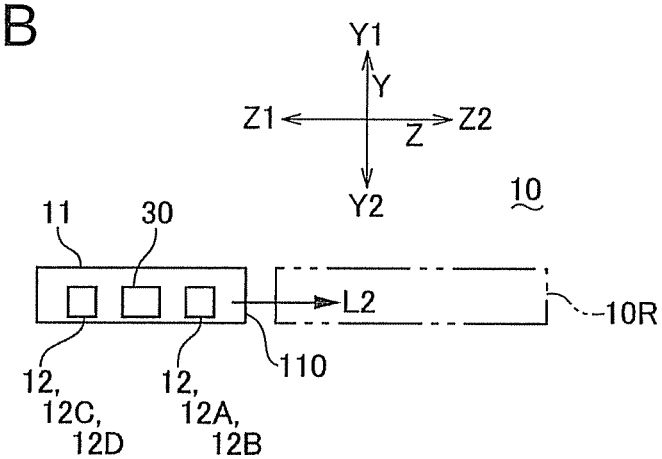
Figure 4:
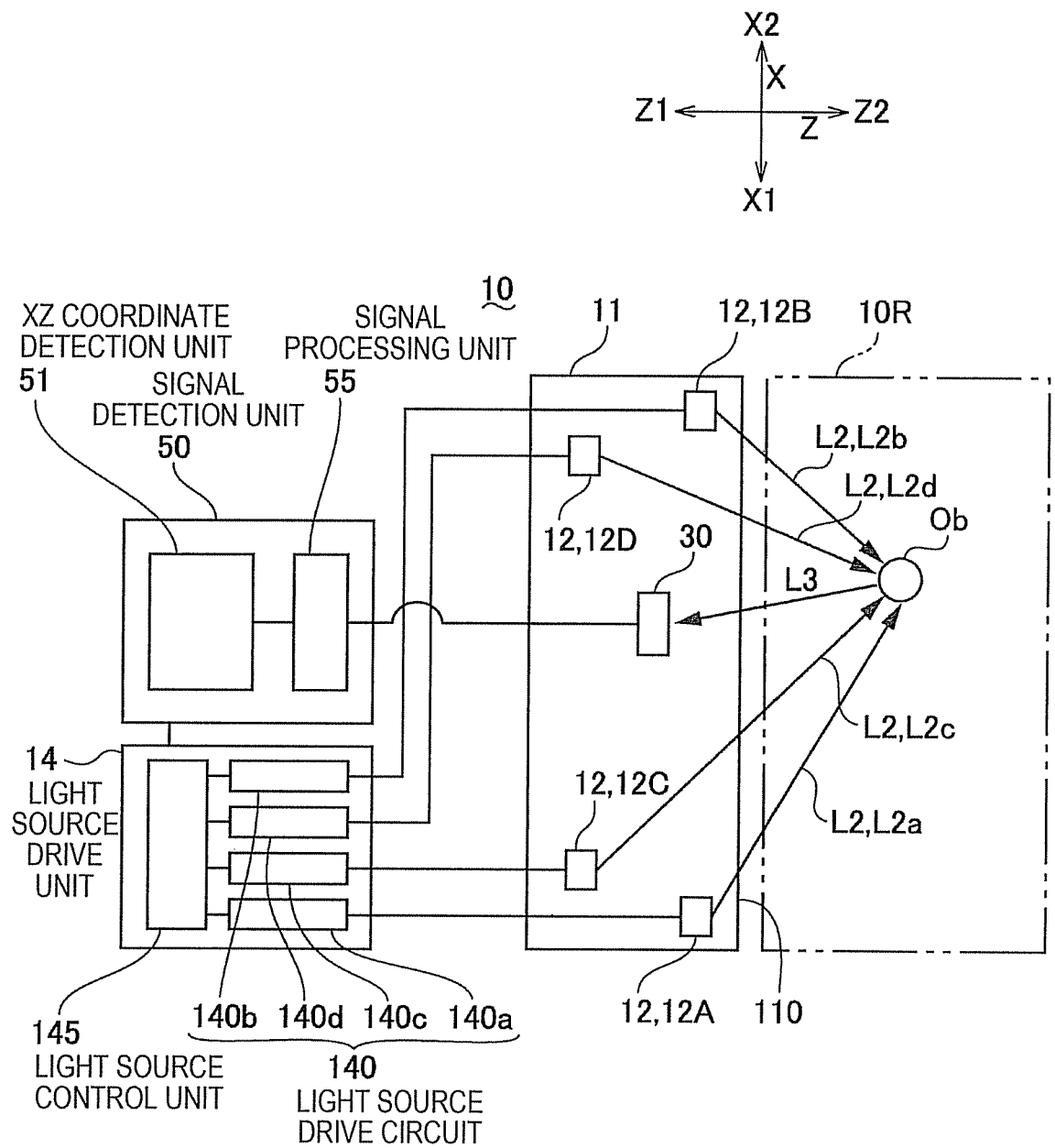
FIG. 4 is an explanatory diagram illustrating the entire configuration of an optical position detection apparatus according to embodiment 2 of the invention.

FIGS. 3A to 3C are explanatory views schematically illustrating a main portion of an optical position detection apparatus according to embodiment 2 of the invention, in which FIG. 3A is an explanatory view illustrating a three-dimensional arrangement of light source units and the like in the optical position detection apparatus, FIG. 3B is an explanatory view illustrating light source units and the like as seen on the other side in the Z-axis direction, and FIG. 3C is an explanatory view illustrating light source units and the like as seen in the X-axis direction. FIG. 4 is an explanatory diagram illustrating the entire configuration of an optical position detection apparatus according to embodiment 2 of the invention, and illustrates light source units and the like as seen in the Y-axis direction. Since the basic configuration in this embodiment is the same as that in embodiment 1, the same reference numerals are used for the common portions, and the description thereof will be omitted.

As illustrated in FIGS. 3A to 3C and 4, in the same manner as embodiment 1, the optical position detection apparatus 10 according to this embodiment includes an optical unit 11 that emits detection lights L2 from one side Z1 in the Z-axis direction to the other side. This optical unit 11 includes a plurality of light source units 12 that emit the detection lights L2 from one side Z1 in the Z-axis direction to the other side Z2, and a light receiving unit 30 detecting a detection light L3 reflected from the target object Ob.

In this embodiment, the optical unit 11 is provided with four light source units as the plurality of light source units 12. In this embodiment, the four light source units 12 include a first light source unit 12A, a second light source unit 12B which is installed in a position that is spaced apart from the first light source unit 12A in the X-axis direction, a third light source unit 12C which is installed in a position that is spaced apart from the first light source unit 12A and the second light source unit 12B to one side Z1 in the Z-axis direction, and a fourth light source unit 12D that is spaced apart from the third light source unit 12C in the X-axis direction and is installed in the same position as the third light source unit 12C in the Z-axis direction. Accordingly, as illustrated in FIG. 4, in the light source drive unit 14, a light source drive circuit 140 includes light source drive circuits 140a to 140d that drive the first light source unit 12A to the fourth light source unit 12D, and a light source control unit 145 controls all the light source drive circuits 140a to 140d.

Here, the first light source unit 12A and the second light source unit 12B are arranged in the same position in the Z-axis direction. Also, the third light source unit 12C is arranged in a position that is shifted from one side Z1 in the Z-axis direction to the other side X2 in the X-axis direction with respect to the first light source unit 12A, and the fourth light source unit 12D is arranged in a position that is shifted from one side Z1 in the Z-axis direction to one side X1 in the X-axis direction with respect to the second light source unit 12B. Further, the third light source unit 12C and the fourth light source unit 12D are positioned within an XZ plane that expands in the Z-axis direction and in the X-axis direction through the first light source unit 12A and the second light source unit 12B, and the first light source unit 12A to the fourth light source unit 12D are positioned within the same XZ plane.

In the optical position detection apparatus 10 as configured above, the first light source unit 12A to the fourth light source unit 12D emit detection lights L2a to L2d. Further, the first light source unit 12A to the fourth light source unit 12D are provided with light emitting portions 120a to 120d which are directed toward the other side Z2 in the Z-axis direction, and the optical exes of the first light source unit 12A to the fourth light source unit 12D are in parallel with one another. In the same manner as the first light source unit 12A to the third light source unit 12C, the fourth light source unit 12D is also composed of LEDs that emit infrared lights.

In the optical position detection apparatus 10 in this embodiment, the position detection unit 50 detects the X coordinates and Z coordinates of the target object Ob in the detection space 10R based on the result of the light reception in the light receiving unit 30 when the light source units 12 that are spaced apart in the X-axis direction among the plurality of light source units 12 (the first light source unit 12A, the second light source unit 12B, and the third light source unit 12C) are sequentially turned on and the result of the light reception in the light receiving unit 30 when the light source units 12 that are spaced apart in the Z-axis direction are sequentially turned on. In this case, the position detection unit 50 obtains the ratio of the distance between one light source unit 12 of the light source units 12, which are alternately turned on, and the target object Ob to the distance between the other light source unit 12 and the target object Ob, and detects the position of the target object Ob based on the geometric line that is set based on the two light source units 12 corresponding to the ratio. In performing such detection, the light source drive unit 145 simultaneously turns on the fourth light source unit 12D with the same luminance as the third light source unit 12C when it turns on the third light source unit 12C.

More specifically, the light source drive unit 14 alternately turns off the first light source unit 12A and the second light source unit 12B in sequentially turning on the light source units 12 that are spaced apart in the X-axis direction.

Further, the light source drive unit 14 alternately turns on the first light source unit 12A, the third light source unit 12C, and the fourth light source unit 12D in sequentially turning on the light source units 12 that are spaced apart in the Z-axis direction. That is, in sequentially turning on the light source units 12 that are spaced apart in the Z-axis direction, the light source drive unit 14 repeats an operation of turning on the first light source unit 12A and turning off the second light source unit 12B, the third light source unit 12C, and the fourth light source unit 12D and an operation of turning off the first light source unit 12A and the second light source unit 12B and simultaneously turning on the third light source unit 12C and the fourth light source unit 12D. In this case, the light source drive unit 14 simultaneously turns on the third light source unit 12C and the fourth light source unit 12D with the same luminance.

According to the above-described configuration, since the third light source unit 12C and the fourth light source unit 12D are simultaneously turned on with the same luminance when the position information of the target object Ob in the Z-axis direction is obtained, the detection lights L2 can be emitted over a wide range in the X-axis direction and in the Z-axis direction. Accordingly, the position of the target object Ob can be detected over a wide range in the X-axis direction and in the Z-axis direction.

Modified Example 1 of Embodiment 2

In embodiment 2 as described above, the light source drive unit 14 alternately turns on the first light source unit 12A and the second light source unit 12B in sequentially turning on the light source units 12 that are spaced apart in the X-axis direction, and alternately turns on the first light source unit 12A, the third light source unit 12C, and the fourth light source unit 12D in sequentially turning on the light source units 12 in the Z-axis direction.

However, in this embodiment, the light source drive unit 14 alternately turns on the first light source unit 12A, the second light source unit 12B, the third light source unit 12C, and the fourth light source unit 12D in sequentially turning on the light source units 12 that are spaced apart in the Z-axis direction. That is, the light source drive unit 14 repeats an operation of simultaneously turning on the first light source unit 12A and the second light source unit 12B and turning off the third light source unit 12C and the fourth light source unit 12D and an operation of turning off the first light source unit 12A and the second light source unit 12B and simultaneously turning on the third light source unit 12C and the fourth light source unit 12D in sequentially turning on the light source units 12 that are spaced apart in the Z-axis direction. In this case, the light source drive unit 14 simultaneously turns on the first light source unit 12A and the second light source unit 12B with the same luminance and simultaneously turns on the third light source unit 12C and the fourth light source unit 12D.

According to the above-described configuration, since the first light source unit 12A and the second light source unit 12B are simultaneously turned on with the same luminance and the third light source unit 12C and the fourth light source unit 12D are simultaneously turned on with the same luminance when the position information of the target object Ob in the Z-axis direction is obtained, the detection lights L2 can be emitted over a wide range in the X-axis direction and in the Z-axis direction. Accordingly, the position of the target object Ob can be detected over a wide range in the X-axis direction and in the Z-axis direction.

Modified Example 2 of Embodiment 2

In embodiment 2 and modified example 1 of embodiment 2 as described above, the light source drive unit 14 alternately turns on the first light source unit 12A and the second light source unit 12B in sequentially turning on the light source units 12 that are spaced apart in the X-axis direction. However, it is also possible to alternately turn on the first and third light source units 12A and 12C and the second and fourth light source units 12B and 12D.

According to the above-described configuration, since the two light source units 12 are simultaneously turned on when the position information of the target object Ob in the X-axis direction is obtained, the detection lights L2 can be emitted over a wide range in the X-axis direction and in the Z-axis direction. Accordingly, the position of the target object Ob can be detected over a wide range in the X-axis direction and in the Z-axis direction.

Embodiment 3

Figure 5A:
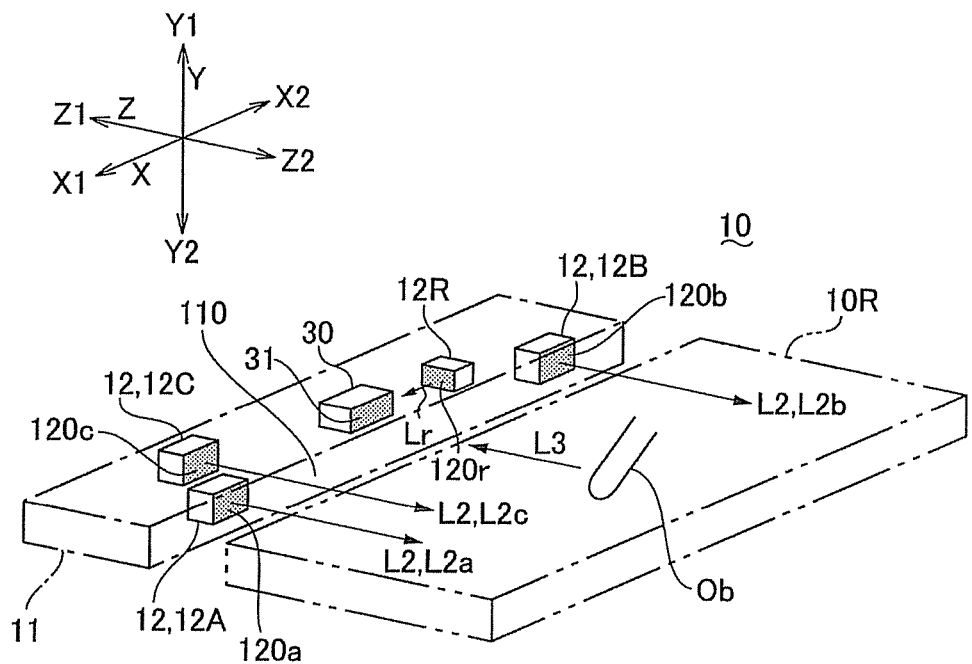
FIGS. 5A to 5C are explanatory views schematically illustrating a main portion of an optical position detection apparatus according to embodiment 3 of the invention.
Figure 5B:
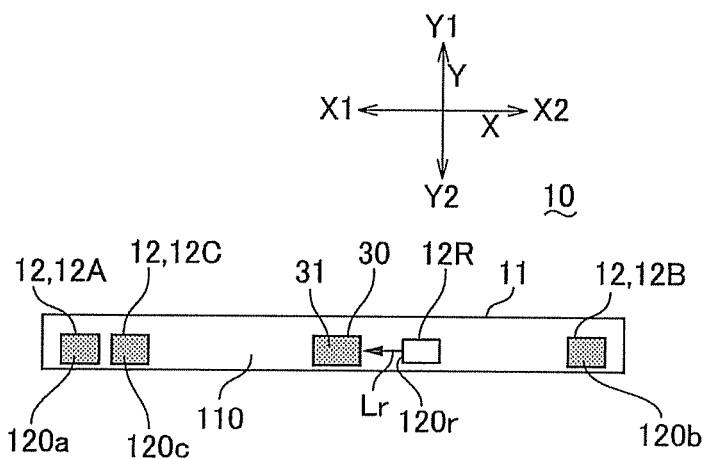
Figure 5C:
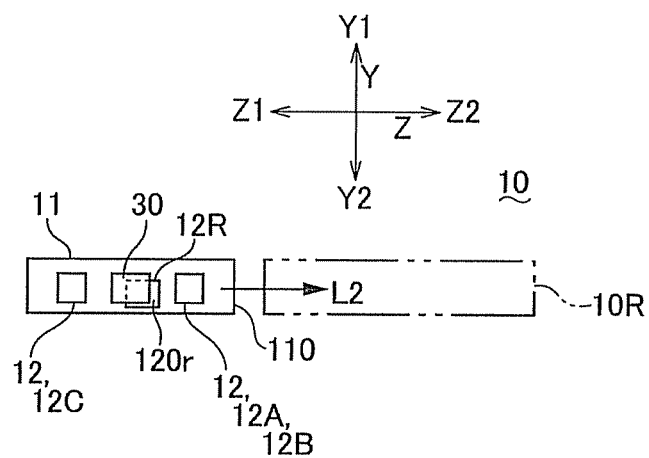
Figure 6:
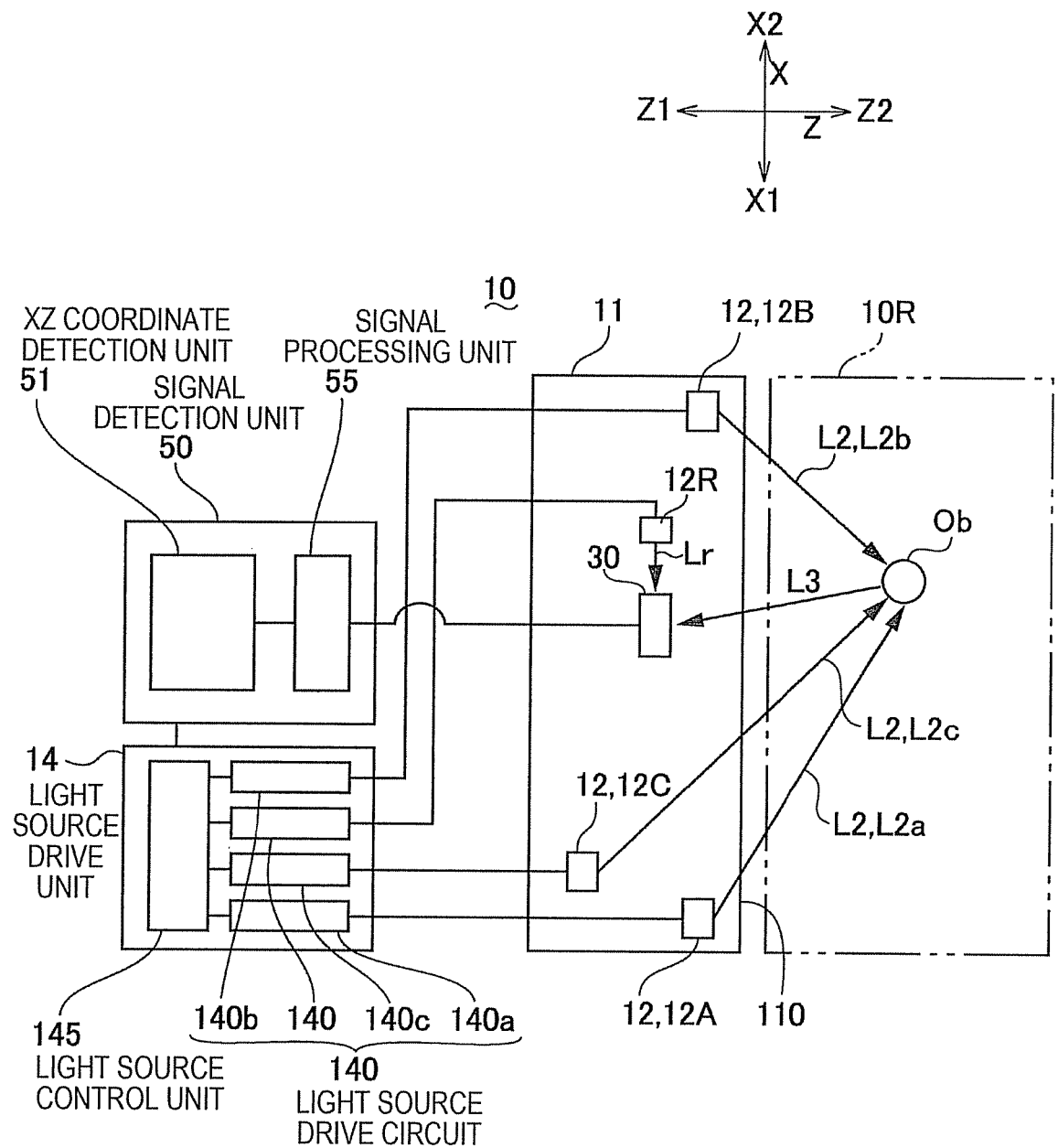
FIG. 6 is an explanatory diagram illustrating the entire configuration of an optical position detection apparatus according to embodiment 3 of the invention.
Figure 7A:
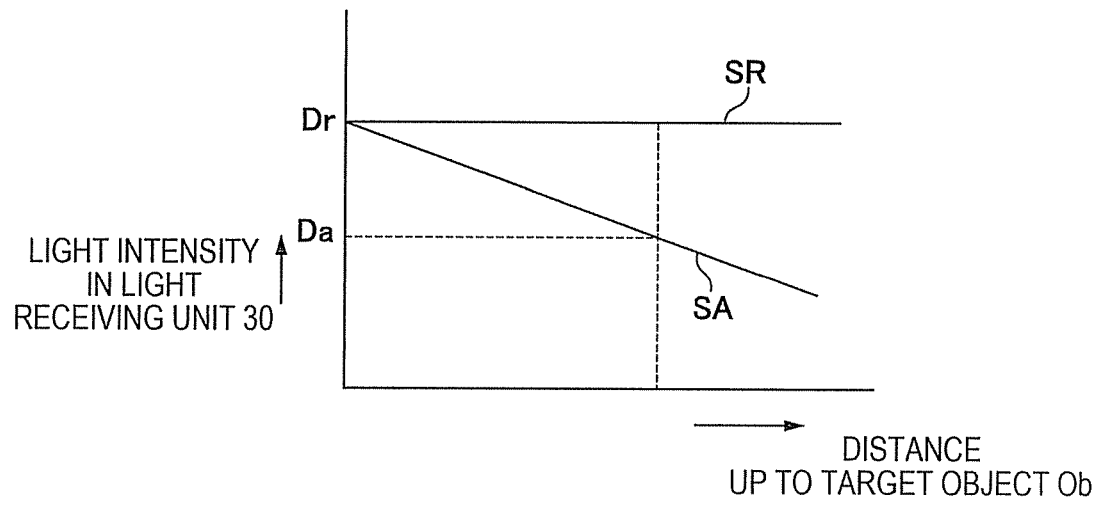
FIGS. 7A and 7B are explanatory diagrams illustrating the principle of detecting the position of a target object using a differential of detection lights and a reference light that is emitted from a reference light source in an optical position detection apparatus according to embodiment 3 of the invention.
Figure 7B:
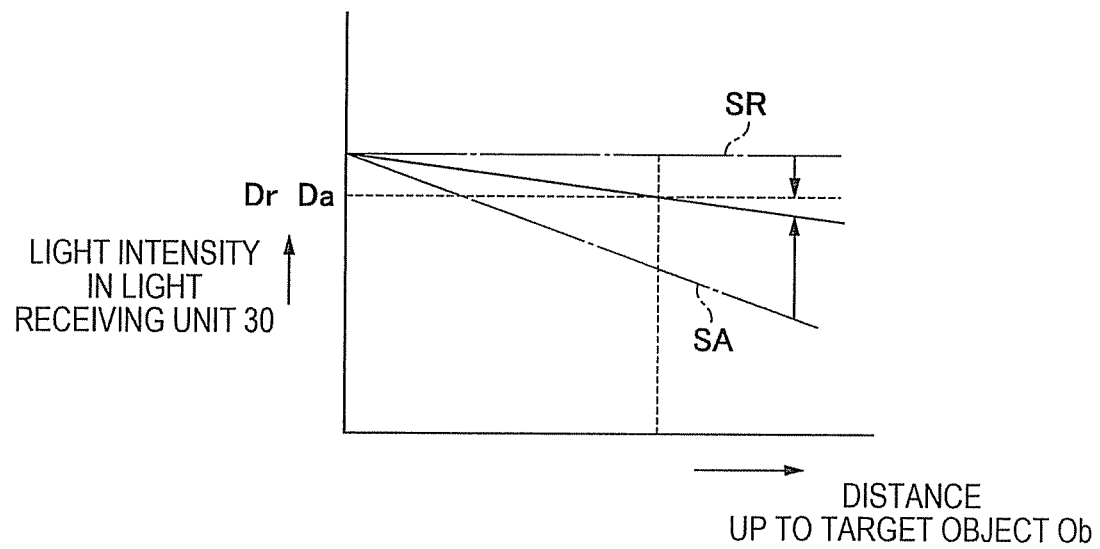

FIGS. 5A to 5C are explanatory views schematically illustrating a main portion of an optical position detection apparatus according to embodiment 3 of the invention, in which FIG. 5A is an explanatory view illustrating a three-dimensional arrangement of light source units and the like in the optical position detection apparatus, FIG. 5B is an explanatory view illustrating light source units and the like as seen on the other side in the Z-axis direction, and FIG. 5C is an explanatory view illustrating light source units and the like as seen in the X-axis direction. FIG. 6 is an explanatory diagram illustrating the entire configuration of an optical position detection apparatus according to embodiment 3 of the invention, and illustrates light source units and the like as seen in the Y-axis direction. FIGS. 7A and 7B are explanatory diagrams illustrating the principle of detecting the position of a target object Ob using a differential of detection lights L2 and a reference light that is emitted from a reference light source in an optical position detection apparatus according to embodiment 3 of the invention, in which FIG. 7A is an explanatory diagram illustrating the relationship between the distance that is measured from the light source unit 12 to the target object Ob and the light intensity of the detection light L2 or the like, and FIG. 7B is an explanatory diagram illustrating the state after the drive current of the light source is adjusted. Since the basic configuration in this embodiment is the same as that in embodiment 1, the same reference numerals are used for the common portions, and the description thereof will be omitted.

As illustrated in FIGS. 5A to 5C and 6, in the same manner as embodiment 1, the appliance 1 having the position detection function according to this embodiment includes an optical unit 11 that emits detection lights L2 from one side Z1 in the Z-axis direction to the other side Z2. This optical unit 11 includes a plurality of light source units 12 that emit the detection lights L2 from one side Z1 in the Z-axis direction to the other side, and a light receiving unit 30 detecting a detection light L3 reflected from the target object Ob. In this embodiment, the optical unit 11 has three or more light source units (first light source unit 12A to third light source unit 12C) that emit the detection lights L2 from one side Z1 in the Z-axis direction to the other side Z2 as the plurality of light source units 12.

Further, the optical unit 11 is also provided with a reference light source 12R that is directed toward the light emission portion 120r in the light receiving unit 30. Accordingly, the light source drive circuit 140 as illustrated in FIG. 6 is provided with a drive circuit 140r for the reference light source 12R.

Here, in the same manner as the light source unit 12, the reference light source 12R is configured by LED (Light Emitting Diodes). The reference light source 12R emits a reference light Lr composed of infrared light having a peak wavelength of 840 to 1000 nm as diverging light. However, the reference light Lr that is emitted from the reference light source 12R is incident to the light receiving unit 30 without passing through the detection space 10R due to the direction of the reference light source 12R and a shielding cover (not illustrated) or the like installed on the side of the reference light source 12R.

In this embodiment, the optical position detection unit 10 uses the differential of the detection light L2a and the reference light Lr and the differential of the detection light L2c and the reference light Lr, instead of a direct differential between the detection lights, and finally derives the same result as that obtained through the direct differential between the detection lights. Here, the differential between the detection light L2a and the reference light Lr and the differential between the detection light L2c and the reference light Lr are executed as follows.

As illustrated in FIG. 7A, in a state where the target object Ob is present in the detection space 10R, the distance from the first light source unit 12A to the target object Ob and the light intensity $D_a$ of the detection light L2a in the light receiving unit 30 change monotonically as indicated by a solid line SA. By contrast, the detected intensity of the light receiving unit 30 of the reference light Lr emitted from the reference light source 12R, as indicated by a solid line SR, is constant regardless of the position of the target object Ob. Accordingly, the light intensity $D_a$ of the detection light L2a in the light receiving unit 30 is different from the detected intensity $D_r$ of the reference light Lr in the light receiving unit 30.

Next, as illustrated in FIG. 7B, by adjusting at least one of the drive current of the first light source unit 12A and the drive current of the reference light source 12R, the light intensity $D_a$ of the detection light L2a in the light receiving unit 30 coincides with the detected intensity $D_r$ of the reference light Lr in the light receiving unit 30. This differential is performed between the reference light Lr and the detection light L2a and between the reference light Lr and the detection lights L2b and L2c. Accordingly, the ratio of the drive current of the first light source unit 12A to the drive current of the second light source unit 12B and the ratio of the drive current of the first light source unit 12A to the drive current of the third light source unit 12C at a time point where the detection result of the detection lights L2a, L2b, and L2c in the light receiving unit 30 becomes equal to the detection result of the reference light Lr in the light receiving unit 30 can be obtained.

The above-described detection principle will be mathematically explained using an optical path function as follows. First, the first light source unit 12A and the reference light source unit 12R are alternately turned on and the second light source unit 12B and the reference light source 12R are alternately turned on. In this case, it is assumed that respective parameters are as follows.

T=the reflection rate of a target object Ob $A_t$=a distance function in that the detection light L2a emitted from the first light source unit 12A is reflected by the target object Ob and reaches the light receiving unit 30

A=the detected intensity of the light receiving unit 30 when the first light source unit 12A is turned on in a state where the target object Ob is present in the detection space 10R $B_t$=a distance function in that the detection light L2b emitted from the second light source unit 12B is reflected by the target object Ob and reaches the light receiving unit 30

B=the detected intensity of the light receiving unit 30 when the second light source unit 12B is turned on in a state where the target object Ob is present in the detection space 10R $R_s$=a distance function measured from the reference light source 12R to the light receiving unit 30

R=the detected intensity of the light receiving unit 30 when only the reference light source 12R is turned on In this case, although the emission intensities of the first light source unit 12A, the second light source unit 12B, and the reference light source 12R are expressed by multiplications of the drive current and the emission coefficient, it is assumed that the emission coefficient is "1" in the following description. Further, in the above-described differential, it is assumed that the drive current of the first light source unit 12A when the light intensities in the light receiving unit 30 become equal to each other is $I_A$, the drive current of the second light source unit 12B is $I_B$, and the drive current of the reference light source 12R is $I_R$. Further, it is assumed that the detected intensity in the light receiving unit 30 when only the reference light source 12R is turned on is equal to the detected intensity during the differential with the first light source unit 12A and the detected intensity during the differential with the second light source unit 12B.

By performing the above-described differential in a state where the target object Ob is present in the detection space 10R, the following relationship is obtained.

$A = T \times A_t \times I_A +$ ambient light  Equation (6)

$B = T \times B_t \times I_B +$ ambient light  Equation (7)

$R = R_s \times I_R +$ ambient light  Equation (8)

Here, since the detection intensities in the light receiving unit 30 are the same during the differential, the following equation (9) is derived from the equations (6) and (8), and the following equation (10) is derived from the equations (7) and (8).

$T \times A_t \times I_A +$ ambient light $= R_s \times I_R +$ ambient light $T \times A_t \times I_A = R_s \times I_R$ $T \times A_t = R_s \times I_R / I_A$  Equation (9)

$T \times B_t \times I_B +$ ambient light $= R_s \times I_R +$ ambient light $T \times B_t \times I_B = R_s \times I_R$ $T \times B_t = R_s \times I_R / I_B$  Equation (10)

Further, since the ratio $P_{AB}$ of the distance functions $A_t$ and $B_t$ is defined by the following equation (11), the ratio $P_{AB}$ of the distance functions is expressed as the following equation (12) from the equations (9) and (10).

$P_{AB} = A_t / B_t$  Equation (11)

$P_{AB} = I_B / I_A$  Equation (12)

In the equation (12), the term "ambient light" does not exist. In this case, with respect to the above-described mathematical models, a correction for offsetting the influence of the detection light L2 that is incident without being reflected by the target object Ob may be performed. Further, even in the case where the detected intensity in the light receiving unit 30 when only the reference light source 12R is turned on is set to a different value in the differential with the first light source unit 12A and the differential with the second light source unit 12B, basically the same principle still holds.

Here, the light source unit 12 is a point light source, and the light intensity at a certain point is in inverse proportion to a square of the distance from the light source. Accordingly, the ratio of the distance $P_1$ that is measured from the first light source unit 12A to the light receiving unit 30 through the target object Ob to the distance $P_2$ that is measured from the second light source unit 12B to the light receiving unit 30 through the target object Ob is obtained by the following equation.

$$P_{AB}=(P_1)^2:(P_2)^2$$

Accordingly, a geometric line that corresponds to the ratio of $P_1:P_2$ can be set based on the first light source unit 12A and the second light source unit 12B in the XZ plane, and the target object Ob is positioned on such a geometric line.

In the same manner, if the ratio of the distance $P_1$ that is measured from the first light source unit 12A to the light receiving unit 30 through the target object Ob to the distance $P_2$ that is measured from the third light source unit 12C to the light receiving unit 30 through the target object Ob is obtained by making a differential of the first light source unit 12A and the third light source unit 12C, the geometric line can be set based on the second light source unit 12B and the fourth light source unit 12D in the XZ plane, and the target object Ob is positioned on the geometric line.

Accordingly, by obtaining an intersection point of the geometric line obtained by performing a differential of the first light source unit 12A and the second light source unit 12B and the geometric line obtained by performing a differential of the first light source unit 12A and the third light source unit 12C, the position (XZ coordinates) of the target object Ob can be obtained.

According to this configuration, the differential of the light source unit 12 and the reference light source 12R is used, and thus the influence of the ambient light or the like can be automatically corrected.

In FIGS. 5A to 5C and 6, it is exemplified that the reference light source 12R is installed in the optical position detection apparatus 10 according to embodiment 1. However, the reference light source 12R may also be installed in the optical position detection apparatus 10 according to embodiment 2.

Configuration Example 1 of an Appliance Having a Position Detection Function

Figure 8A:
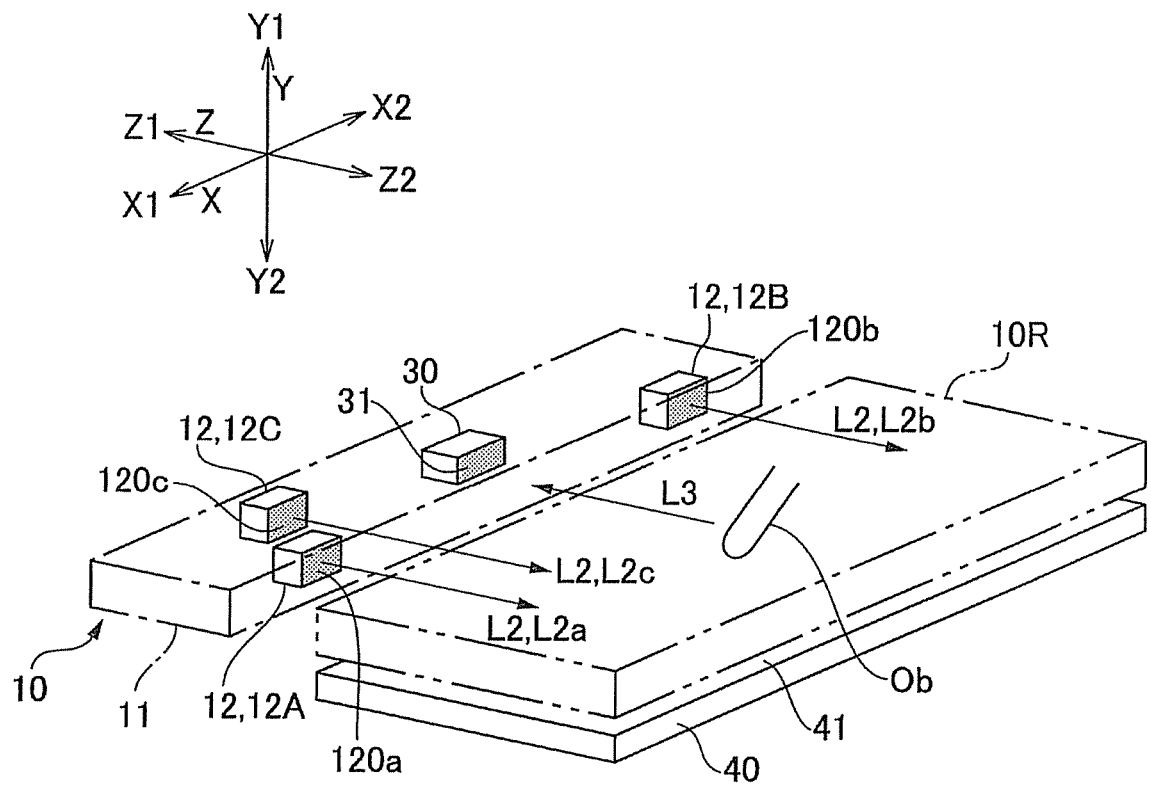
FIGS. 8A and 8B are explanatory views of an appliance having a position detection function that uses an optical position detection apparatus to which the invention is applied.
Figure 8B:
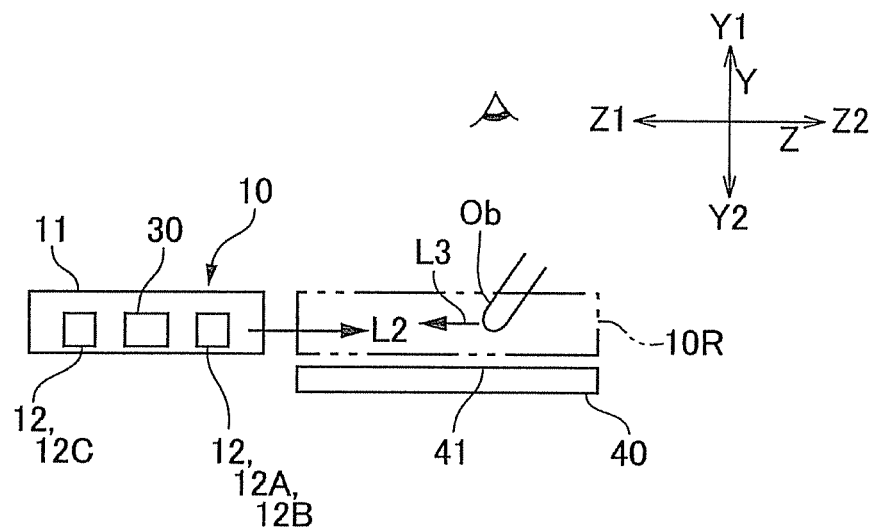

FIGS. 8A and 8B are explanatory views of an appliance having a position detection function that uses an optical position detection apparatus 10 to which the invention is applied, in which FIG. 8A is an explanatory view illustrating the position relationship between the optical unit 11 and the visible surface configuration member of the optical position detection apparatus, and FIG. 8B is an explanatory view illustrating the optical unit 11 as seen from the X-axis direction.

As illustrated in FIGS. 8A and 8B, the optical position detection apparatus 10 as described above with reference to FIGS. 1A to 7B may be used to configure an appliance 1 having a position detection function provided with a visible surface configuration member 40. The visible surface configuration member 40 is formed of a sheet-shaped or plate-shaped transmission member that is positioned on the other side Z2 in the Z-axis direction with respect to the optical unit 11 provided with the light source unit 12 and the light receiving unit 30.

Here, the visible surface configuration member 40 is arranged so that a visible surface 41 is spread along the XZ plane, and from the optical unit 11 of the optical position detection apparatus 10, the detection light L2 is emitted along the visible surface 41. Accordingly, if a user moves the target object Ob, which may be a finger end or the like, to a specified position while seeing information that is displayed on the visible surface 41 of the visible surface configuration member 40, the operation of the optical position detection apparatus 10 can be changed in consideration of the position of the target object Ob as input information.

As will be described with reference to FIGS. 9 to 13B, the appliance 1 having the position detection function as described above may be configured as a direct-view display device having a position detection function, a screen device having a position detection function, a projection display device having a position detection function, a show window having a position detection function, or an amusement appliance having a position detection function.

Configuration Example of a Direct-View Display Device Having a Position Detection Function Referring to FIG. 9, an example of a direct-view display device having a position detection function, which uses a direct-view image generation device as the visible surface configuration member 40 of the appliance 1 having the position detection function, will be described.

Figure 9:
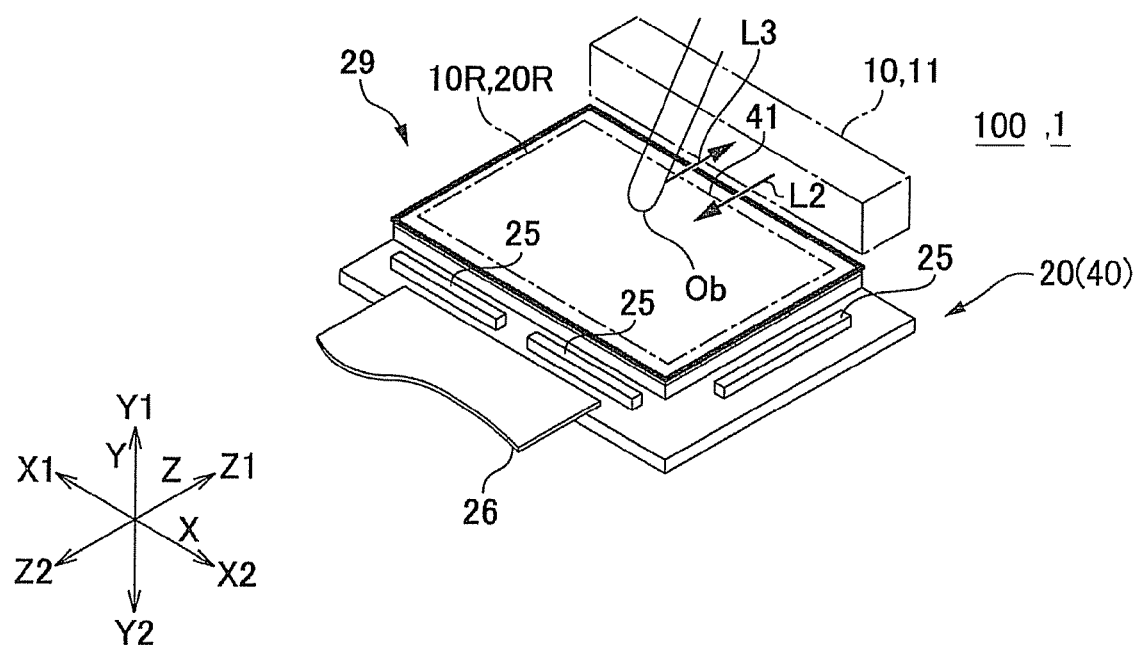
FIG. 9 is an exploded perspective view of a direct-view display device having a position detection function (an appliance having a position detection function) to which the invention is applied.

FIG. 9 is an exploded perspective view of a direct-view display device having a position detection function (an appliance 1 having a position detection function) to which the invention is applied. In the direct-view display device having the position detection function in this embodiment, since the configuration of the optical position detection apparatus 10 is the same as that as described above with reference to FIGS. 1A to 7B, the same reference numerals are used for the common portions, and the description thereof will be omitted.

The direct-view display device 100 having the position detection function as illustrated in FIG. 9 includes the optical position detection apparatus 10 as described above with reference to FIGS. 1A to 7B, and various kinds of direct-view image generation devices 20 (direct-view display device/visible surface configuration member 40). The direct-view display device 100 is provided with a visible surface 41 on which information is visible by one surface of the image generation device 20. The image generation device 20 is provided with an image display region 20R on the visible surface 41, and this image display region 20R overlaps the detection space 10R as seen in the Y-axis direction.

The image generation device 20 is provided with an image generation panel 29. On the image generation panel 29, for example, electronic components 25 that configure driving circuits and the like are mounted and a wire member 26 of a flexible printed circuit board (FPC) or the like is connected.

In the direct-view display device 100 having the position detection function as configured above, the optical position detection apparatus 10 is provided with the optical unit 11 on the side of the image display region 20R of the image generation device 20. Accordingly, the direct-view display device 100 having the position detection function can detect the position of the target object Ob, and by indicating the image displayed on the image generation device 20 with the target object Ob such as a finger end or the like, specified information input can be performed.

Configuration Example of a Screen Device Having a Position Detection Function Referring to FIGS. 10A and 10B, an example of a screen device having a position detection function, which uses a screen as the visible surface configuration member 40 of the appliance 1 having the position detection function and has the position detection function of the appliance 1, will be described.

Figure 10A:
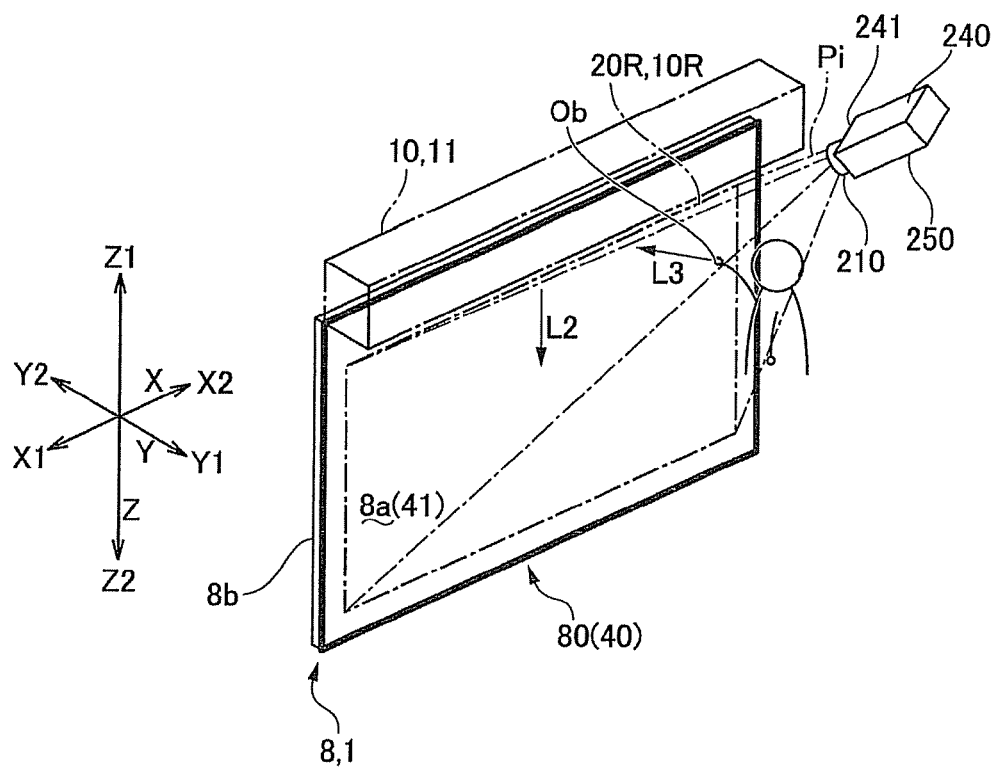
FIGS. 10A and 10B are explanatory views of a screen device having a position detection function (an appliance having a position detection function) to which the invention is applied.
Figure 10B:
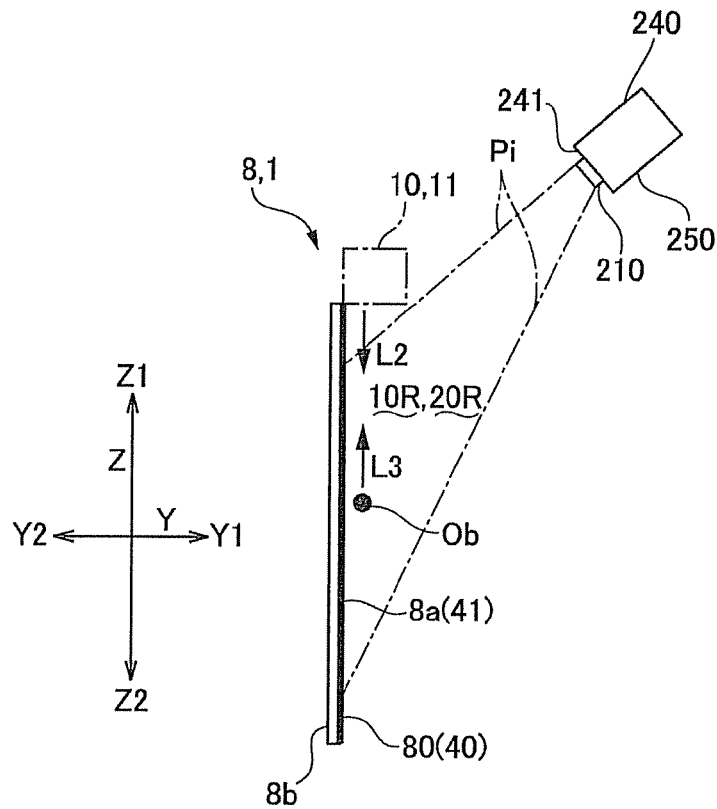

FIGS. 10A and 10B are explanatory views of a screen device having a position detection function (an appliance 1 having a position detection function) to which the invention is applied, in which FIG. 10A is an explanatory view schematically illustrating a screen device having the position detection function as seen obliquely from an upper portion, and FIG. 10B is an explanatory view schematically illustrating a screen device as seen from the horizontal direction. In the screen device having the position detection function in this embodiment, since the configuration of the optical position detection apparatus 10 is the same as that as described above with reference to FIGS. 7A and 7B, the same reference numerals are used for the common portions, and the description thereof will be omitted.

The screen device 8 having the position detection function as illustrated in FIGS. 10A and 10B includes a screen (visible surface configuration member 40) onto which an image from an image projection device 250 (image generation device) that is called a liquid crystal projector or a digital micro-mirror device is projected, and the optical position detection apparatus 10 as described above with reference to FIGS. 1A to 7B. The image projection device 250 expands and projects an image display light Pi from a projection lens system 210 installed on a front surface unit 241 of the housing 240 to the screen device 8. Accordingly, in the screen device 8 having the position detection function, the visible surface 41 on which information is visible is configured by a screen surface 8a of the screen 80 onto which the image is projected.

In the screen device 8 having the position detection function as described above, the optical position detection apparatus 10 is provided with the optical unit 11 on the side of the screen surface 8a (the visible surface 41) of the screen 80 (the visible surface configuration member 40). Accordingly, in the screen device 8 having the position detection function in this embodiment, for example, by advancing the target object Ob such as a finger end or the like to apart of an image projected onto the screen 80, the position of the target object Ob can be used as input information such as instruction for changing the image.

In this embodiment, as the screen device 8 having the position detection function, the screen device for the projection display device onto which the image from the image projection device 250 is projected has been described. However, a screen device having the position detection function for an electronic blackboard may be configured by installing the optical position detection apparatus 10 on the screen of the electronic blackboard.

Configuration Example of a Projection Display Device Having a Position Detection Function Referring to FIGS. 11A and 11B, an example of a projection display device having a position detection function, which uses a screen as the visible surface configuration member 40 of the appliance 1 having the position detection function, will be described.

Figure 11A:
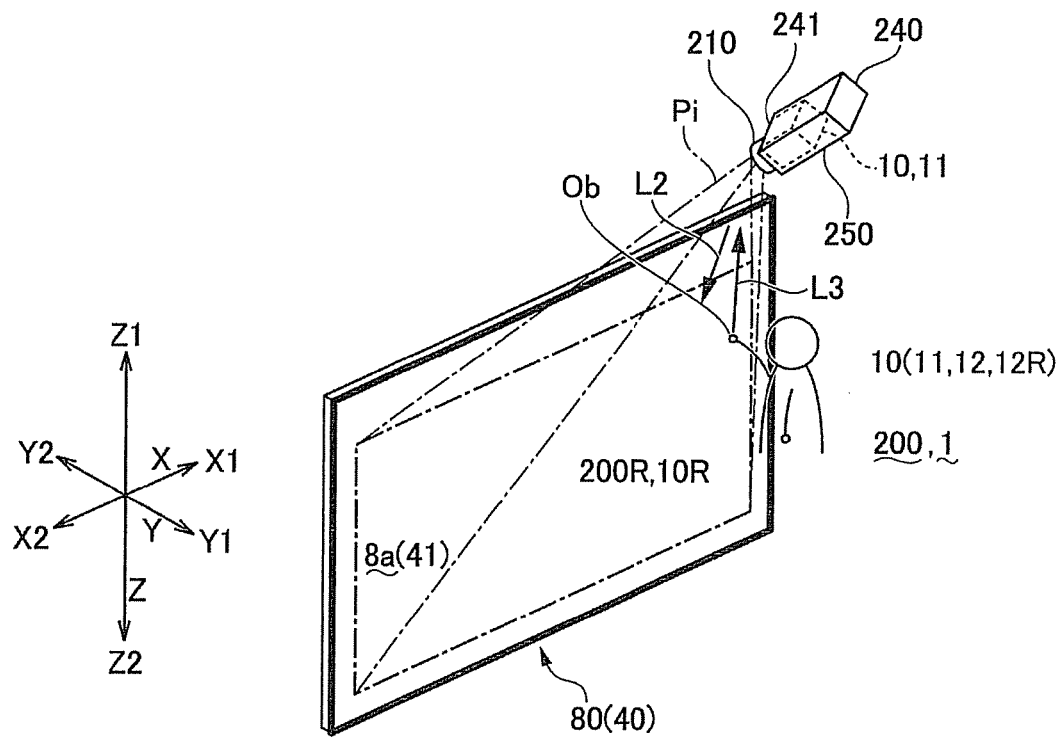
FIGS. 11A and 11B are explanatory views of a projection display device having a position detection function (an appliance having a position detection function) to which the invention is applied.
Figure 11B:
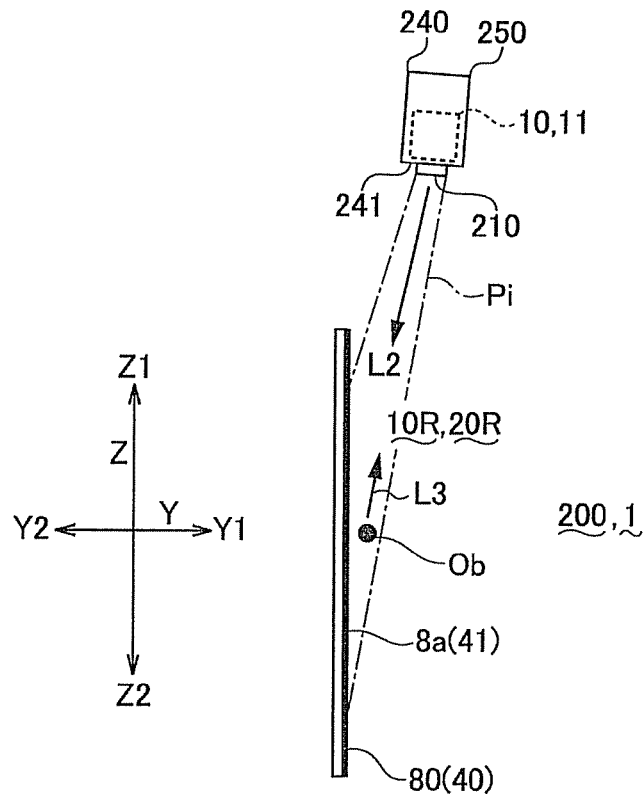

FIGS. 11A and 11B are explanatory views of a projection display device having a position detection function (an appliance 1 having a position detection function) to which the invention is applied, in which FIG. 11A is an explanatory view schematically illustrating a projection display device having the position detection function as seen obliquely from an upper portion, and FIG. 11B is an explanatory view schematically illustrating a projection display device as seen from the horizontal direction. In the projection display device having the position detection function in this embodiment, since the configuration of the optical position detection apparatus 10 is the same as that as described above with reference to FIGS. 1A to 7B, the same reference numerals are used for the common portions, and the description thereof will be omitted.

The projection display device 200 having the position detection function as illustrated in FIGS. 11A and 11B includes an image projection device 250 (image generation device) that is called a liquid crystal projector or a digital micro-mirror device, and the optical position detection apparatus 10 as described above with reference to FIGS. 1A to 7B. The image projection device 250 expands and projects an image display light Pi from a projection lens system 210 installed on a front surface unit 201 of the housing 240 to the screen device 8. In the projection display device 200 as described above, the visible surface 41 on which information is visible is configured by a screen surface 8a of the screen 80 onto which the image is projected.

In the projection display device 200 having the position detection function as described above, the optical position detection apparatus 10 is mounted on the image projection device 250 that is arranged on the side of the screen surface 8a (visible surface 41) of the screen 80. Accordingly, the optical position detection apparatus 10 emits the detection light L2 from the image projection device 250 along the visible surface 41 of the screen 80 (visible surface configuration member 40). Further, the optical position detection apparatus 10 detects the detection light L3 that is reflected by the target object Ob from the image projection device 250.

In the projection display device 200 having the position detection function as described above, the detection space 10R is a rectangular region as seen from the direction of the normal line with respect to the screen 80, and overlaps the region (image display region 20R) onto which the image is projected by the image projection device 250 in the screen 80. Accordingly, in the projection display device 200 having the position detection function in this embodiment, for example, by advancing the target object Ob such as a finger end or the like to a part of an image projected onto the screen 80, the position of the target object Ob can be used as input information such as instruction for changing the image.

Configuration Example of a Show Window Having a Position Detection Function

Figure 12A:
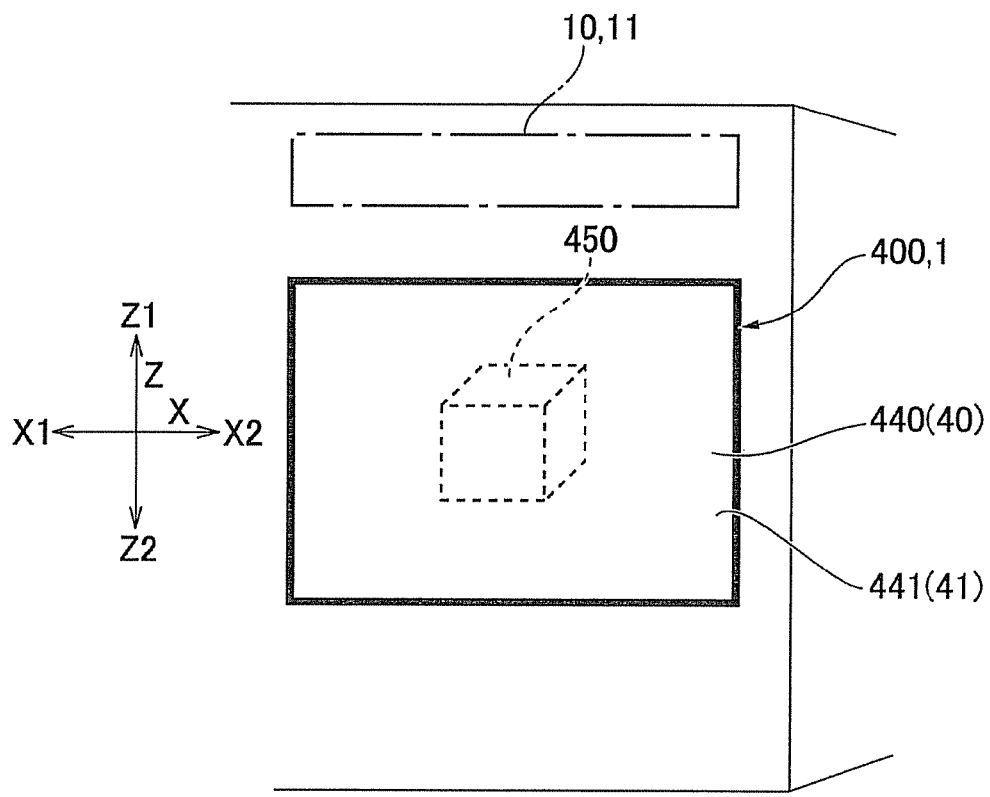
FIGS. 12A and 12B are explanatory views of a window having a position detection function (an appliance having a position detection function) to which the invention is applied.
Figure 12B:
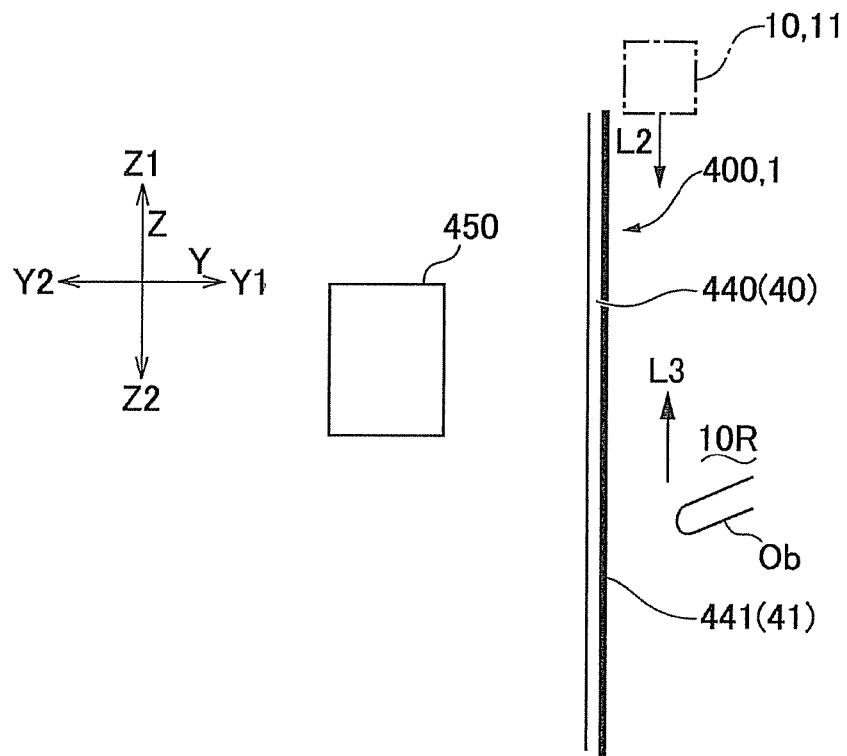

Referring to FIGS. 12A and 12B, an example of a window (show window having a position detection function) having a position detection function, which uses a transmission member that covers an exhibit as information, as the visible surface configuration member 40 of the appliance 1 having the position detection function, will be described.

FIGS. 12A and 12B are explanatory views of a window (an appliance 1 having a position detection function) having a position detection function to which the invention is applied, in which FIG. 12A is an explanatory view schematically illustrating a window having the position detection function as seen from the outside (visible surface side), and FIG. 12B is an explanatory view schematically illustrating the cross section of the window. In the window having the position detection function in this embodiment, since the configuration of the optical position detection apparatus 10 is the same as that as described above with reference to FIGS. 1A to 7B, the same reference numerals are used for the common portions, and the description thereof will be omitted.

The window 400 having the position detection function as illustrated in FIGS. 12A and 12B includes a transmission member 440 (visible surface configuration member 40) that covers the exhibit 450 as information, and visible surface (visible surface 41) of the exhibit 450 is configured by the outer surface 441 of the transmission unit 440. Further, in the window 400 having the position detection function, the exhibit 450 is maintained on an actuator (not illustrated) that makes the exhibit 450 perform an operation such as forward movement and swing.

The window 400 having the position detection function as described above is provided with the optical unit 11 of the optical position detection apparatus 10 as described above with reference to FIGS. 1A to 7B on the side of the outer surface 441 of the transmission member 440, and the optical unit 11 emits the detection light L2 along the outer surface 441 (visible surface 41) of the transmission member 440. Further, the optical unit 11 detects the detection light L3 that is reflected by the target object Ob.

In the window 400 having the position detection function as described above, the detection space 10R of the optical position detection apparatus 10 is installed on the side of the outer surface 441 of the transmission member 440. Accordingly, by advancing the target object Ob such as a finger end or the like to the detection space 10R, the position of the target object Ob can be used as input information such as instruction for changing the direction of the exhibit 450. For example, if the target object Ob such as the finger end or the like moves downward, the exhibit 450 advances the transmission member 440, while if the target object Ob such as the finger end or the like moves to the right, the direction of the exhibit 450, such as swing the exhibit 450 to the right, can be changed.

Configuration Example of an Amusement Appliance Having a Position Detection Function Referring to FIGS. 13A and 13B, an example of an amusement appliance having a position detection function, which uses a base that supports a moving medium for a game in an amusement appliance such as a pachinko (Japanese pinball) machine as the visible surface configuration member 40 of the appliance 1 having the position detection function, will be described.

Figure 13A:
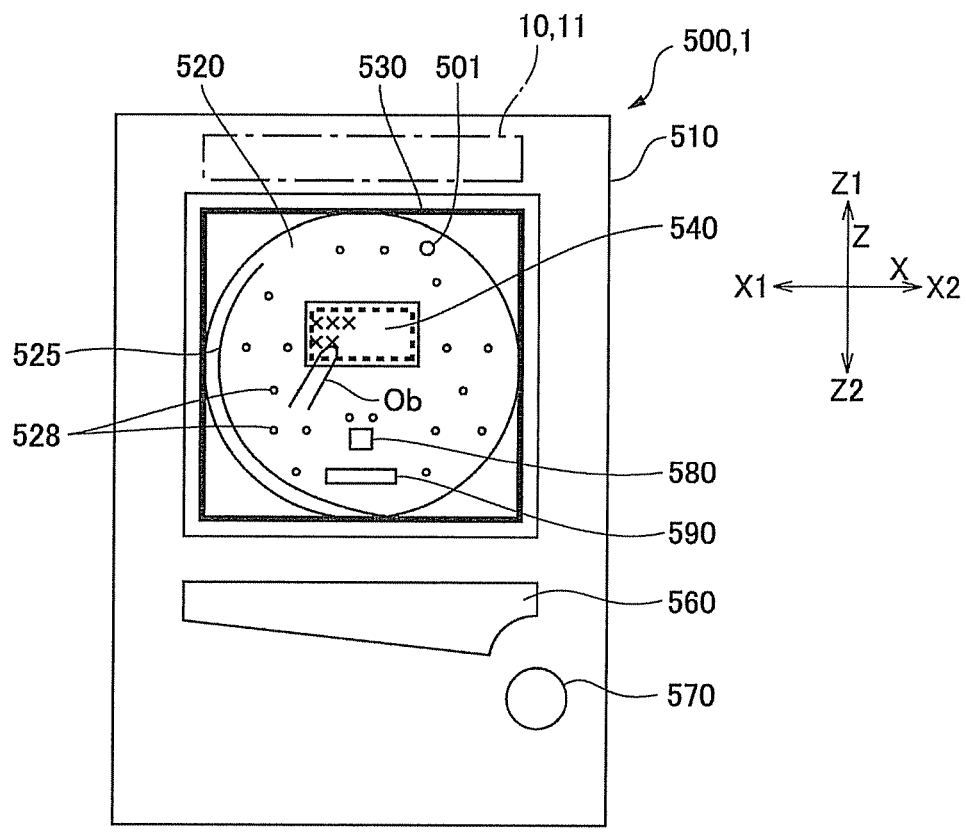
FIGS. 13A and 13B are explanatory views of an amusement device having a position detection function (an appliance having a position detection function) to which the invention is applied.
Figure 13B:
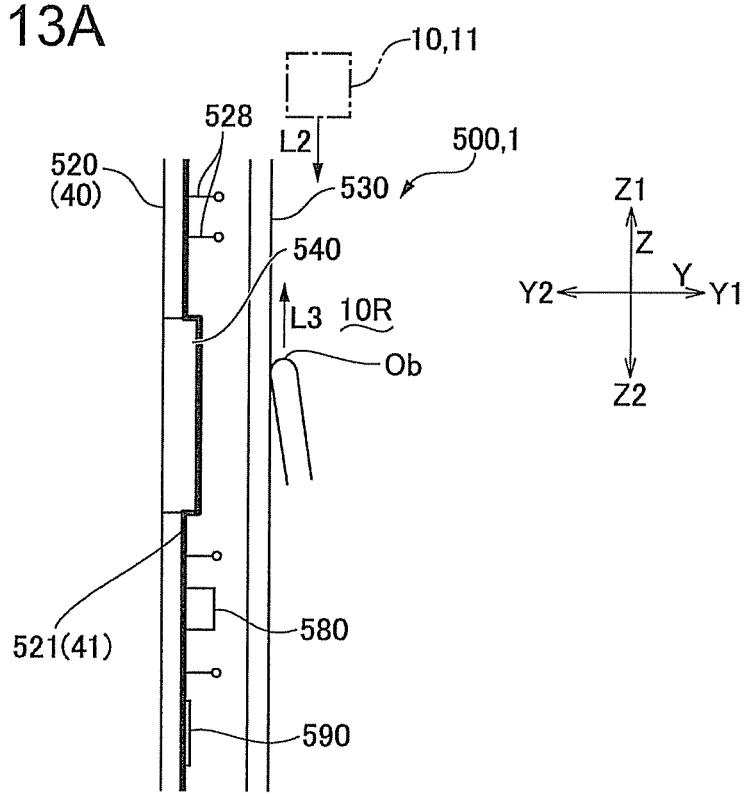

FIGS. 13A and 13B are explanatory views of an amusement appliance having a position detection function (an appliance 1 having a position detection function) to which the invention is applied, in which FIG. 13A is an explanatory view schematically illustrating an amusement appliance having the position detection function as seen from the front portion (visible surface side), and FIG. 13B is an explanatory view schematically illustrating the cross section thereof. In the amusement appliance having the position detection function in this embodiment, since the configuration of the optical position detection apparatus 10 is the same as that as described above with reference to FIGS. 1A to 7B, the same reference numerals are used for the common portions, and the description thereof will be omitted.

The amusement appliance 500 having the position detection function as illustrated in FIGS. 13A and 13B includes a plate-shaped base 520 (visible surface configuration member 40) that supports a medium for a game 501 such as pachinko glass beads, an outer frame 510 for maintaining the base 520, a handle 570 for setting a position or the like in which the game medium 501 is output onto the base 520, and a saucer 560 for receiving the game medium 501. The surface 521 (visible surface 41) of the base 520 is covered by a glass plate 530, and inside the glass plate 530 on the surface 521 of the base 520, a guide rail 525 for the game medium 501, a nail 528 for changing the movement of the game medium 501, and winning openings 580 and 590 are provided. Further, inside the glass plate 530 on the surface 521 of the base 520, an image generation device 540 for displaying the result of the lottery that is performed whenever the game medium 501 enters into the winning opening 580.

In the amusement appliance 500 having the position detection function, the optical unit 11 of the optical position detection apparatus 10 described with reference to FIGS. 1A to 7B is installed on the outer side of the glass plate 530, and emits the detection light L2 according to the outer surface of the glass plate 530. Further, the optical unit 11 detects the detection light L3 that is reflected from the target object Ob.

Accordingly, if a gamer advances the target object Ob such as a finger end or the like to the detection space 10R to match the contents displayed on the image generation device 540 or the progress of the game, the position of the target object Ob can be used as input information such as instruction for changing the contents displayed on the image generation device 540.

Configuration Example 2 of an Appliance Having a Position Detection Function

Figure 14A:
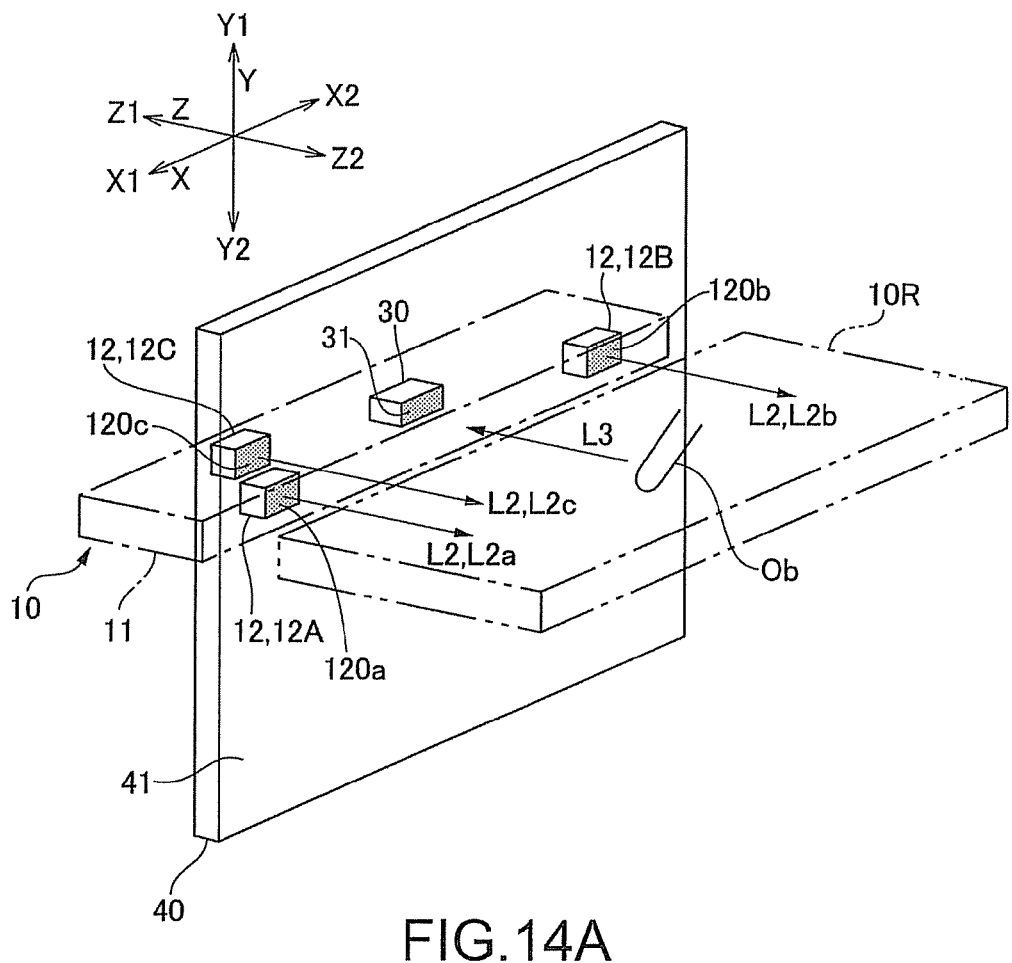
FIGS. 14A and 14B are explanatory views of an appliance having another position detection function using an optical position detection apparatus to which the invention is applied.
Figure 14B:
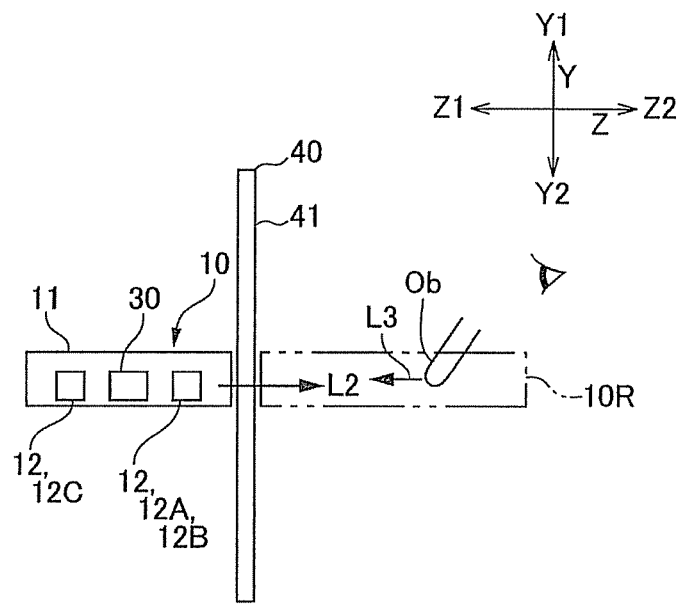

FIGS. 14A and 14B are explanatory views of an appliance having another position detection function that uses an optical position detection apparatus 10 to which the invention is applied, in which FIG. 14A is an explanatory view illustrating the position relationship between the optical unit 11 and the visible surface configuration member of the optical position detection apparatus, and FIG. 14B is an explanatory view illustrating the optical unit 11 as seen from the X-axis direction.

As illustrated in FIGS. 14A and 14B, the optical position detection apparatus 10 as described above with reference to FIGS. 1A to 7B may be used to configure an appliance 1 having a position detection function provided with a visible surface configuration member 40. The visible surface configuration member 40 is formed of a sheet-shaped or plate-shaped transmission member that is positioned on the other side Z2 in the Z-axis direction with respect to the optical unit 11 provided with the light source unit 12 and the light receiving unit 30.

Here, the visible surface configuration member 40 is arranged so that a visible surface 41 is spread along the XY plane, and from the optical unit 11 of the optical position detection apparatus 10, the detection light L2 is emitted along the visible surface 41. Accordingly, if a user moves the target object Ob, which may be a finger end or the like, to a specified position while seeing information that is displayed on the visible surface 41 of the visible surface configuration member 40, the operation of the optical position detection apparatus 10 can be changed in consideration of the position of the target object Ob as input information.

As will be described with reference to FIGS. 15 to 18B, the appliance 1 having the position detection function as described above may be configured as a direct-view display device having a position detection function, a screen device having a position detection function, a projection display device having a position detection function, a show window having a position detection function, or an amusement appliance having a position detection function.

Figure 15:
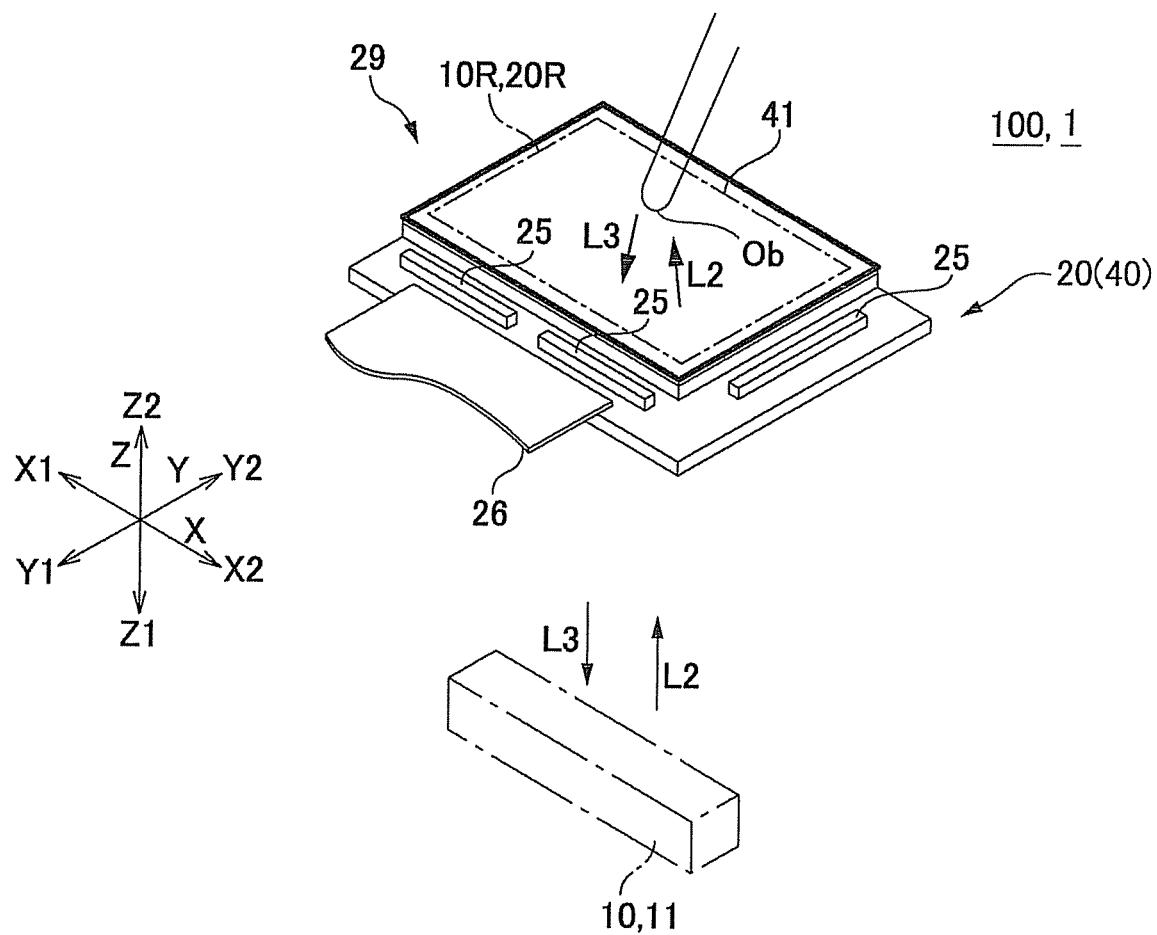
FIG. 15 is an exploded perspective view of a direct-view display device having another position detection function (an appliance having a position detection function) to which the invention is applied.

Configuration Example of a Direct-View Display Device Having a Position Detection Function FIG. 15 is an exploded perspective view of a direct-view display device having another position detection function (an appliance 1 having a position detection function) to which the invention is applied. In the direct-view display device having the position detection function in this embodiment, since the configuration of the optical position detection apparatus 10 is the same as that as described above with reference to FIGS. 1A to 7B, the same reference numerals are used for the common portions, and the description thereof will be omitted.

The direct-view display device 100 having the position detection function as illustrated in FIG. 15 includes the optical position detection apparatus 10 as described above with reference to FIGS. 1A to 7B, and various kinds of direct-view image generation devices 20 (direct-view display device/visible surface configuration member 40). The direct-view display device 100 is provided with a visible surface 41 on which information is visible by one surface of the image generation device 20. The image generation device 20 is provided with an image display region 20R on the visible surface 41, and this image display region 20R overlaps the detection space 10R as seen in the Y-axis direction. Since the image generation device 20 has the same configuration as the image generation device 20 as described above with reference to FIG. 9, the description thereof will be omitted. However, the image generation device 20 is provided with an image generation panel 29 and the like.

Here, the optical unit 11 of the optical position detection apparatus 10 is arranged on the opposite side to the emission side of the display light with respect to the image generation panel 29. Accordingly, in order to detect the position of the target object Ob, it is necessary to emit the detection light L2 to the detection space 10R in which the target object Ob is positioned. Accordingly, the image display region 20R of the image generation panel 29 is configured so as to transmit the detection light L2.

In the direct-view display device 100 having the position detection function as configured above, the optical unit 11 emits the detection light L2 to the detection space 10R which is positioned on the side of the visible surface 41 that is opposite to the side of the visible surface 41 in the optical position detection apparatus 20 (visible surface configuration member 40), and detects the detection light L3 that is reflected from the target object Ob and passes through the image generation device 20. Accordingly, the direct-view display device 100 having the position detection function can detect the position of the target object Ob, and by indicating the image displayed on the image generation device 20 with the target object Ob such as a finger end or the like, specified information input can be performed.

Figure 16A:
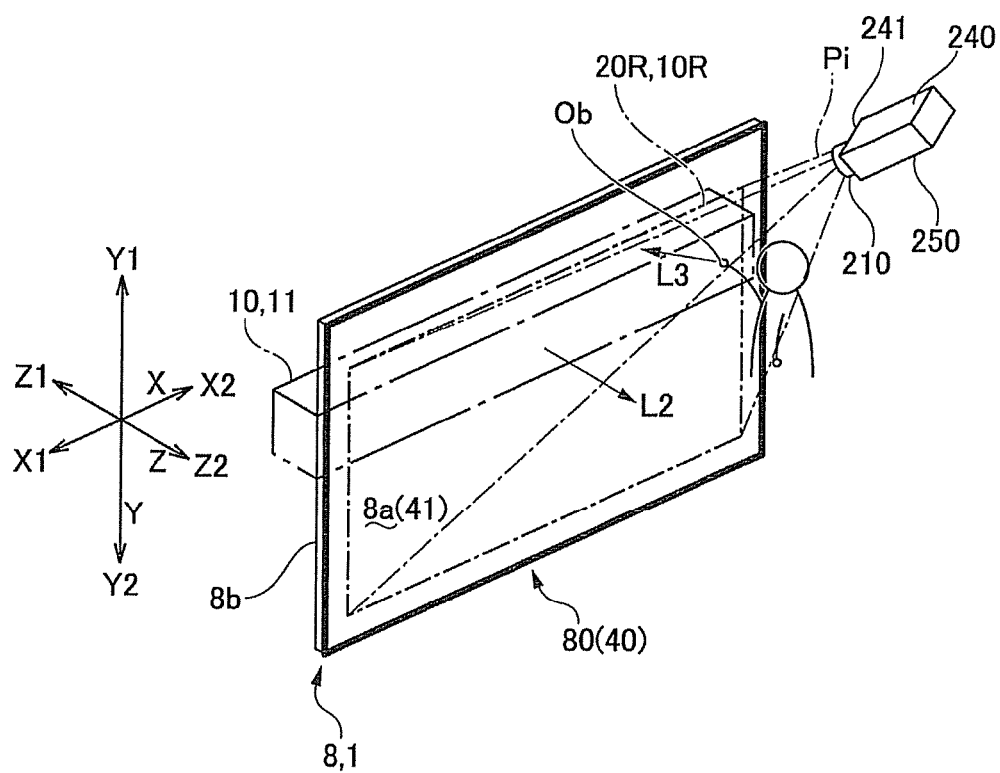
FIGS. 16A and 16B are explanatory views of a screen device having another position detection function (an appliance having a position detection function) to which the invention is applied.
Figure 16B:
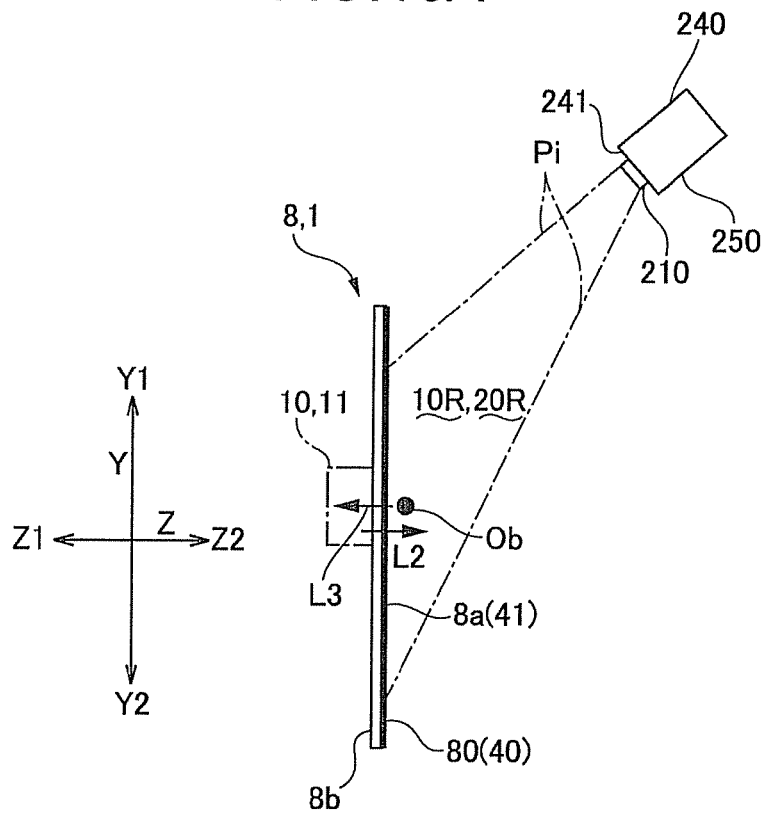

Configuration Example of a Screen Device Having a Position Detection Function FIGS. 16A and 16B are explanatory views of a screen device having a position detection function (an appliance 1 having a position detection function) to which the invention is applied, in which FIG. 16A is an explanatory view schematically illustrating a screen device having the position detection function as seen obliquely from an upper portion, and FIG. 16B is an explanatory view schematically illustrating a screen device as seen from the horizontal direction. In the screen device having the position detection function in this embodiment, since the configuration of the optical position detection apparatus 10 is the same as that as described above with reference to FIGS. 7A and 7B, the same reference numerals are used for the common portions, and the description thereof will be omitted.

The screen device 8 having the position detection function as illustrated in FIGS. 16A and 16B includes a screen (visible surface configuration member 40) onto which an image from an image projection device 250 (image generation device) that is called a liquid crystal projector or a digital micromirror device is projected, and the optical position detection apparatus 10 as described above with reference to FIGS. 1A to 7B. The image projection device 250 expands and projects an image display light Pi from a projection lens system 210 installed on a front surface unit 241 of the housing 240 to the screen device 8. Accordingly, in the screen device 8 having the position detection function, the visible surface 41 on which information is visible is configured by a screen surface 8a of the screen 80 onto which the image is projected.

In the screen device 8 having the position detection function as described above, the optical position detection apparatus 10 is provided with the optical unit 11 that is on the side of the back surface 8b that is opposite to the screen surface 8a (visible surface 41) of the screen 80 (visible surface configuration member 40). Due to this, the optical unit 11 emits the detection light L2 from the side opposite to the visible surface 41 to the detection space 10R set on the side of the visible surface 41 on the screen 80 (visible surface configuration member 40). Further, the optical unit 11 detects the detection light L3 that is reflected by the target object Ob and passes through the screen 80. Accordingly, the screen 80 has light transmission with respect to the detection light L2. More specifically, the screen 80 is made of cloth, of which one surface that forms the screen surface 8a is coated with white paint, or a white screen made of a white embossed vinyl material, and has the light transmission with respect to the detection light L2 composed of infrared light. The screen 80 may be a silver screen with a high silver color to improve the light reflection rate, a pearl screen on which the surface of the cloth that forms the side of the screen surface 8a is resin-treated to heighten the light reflection rate, or a piece screen on which minute particles of glass powder is spread on the side of the screen surface 8a to heighten the light reflection rate, and even in this case, the screen 80 has the light transmission with respect to the detection light L2 composed of infrared light. In order to heighten the quality of a displayed image, the screen 80 may have a black shielding layer that is formed on the back surface 8b of the screen 80, and in this case, a plurality of light transmission portions composed of holes may be formed on the shielding layer.

In the screen device 8 having the position detection function as described above, for example, by advancing the target object Ob such as a finger end or the like to a part of an image projected onto the screen 80, the position of the target object Ob can be used as input information such as instruction for changing the image.

In this embodiment, as the screen device 8 having the position detection function, the screen device for the projection display device onto which the image from the image projection device 250 is projected has been described. However, a screen device having the position detection function for an electronic blackboard may be configured by installing the optical position detection apparatus 10 on the screen of the electronic blackboard.

Configuration Example of a Show Window Having a Position Detection Function

Figure 17A:
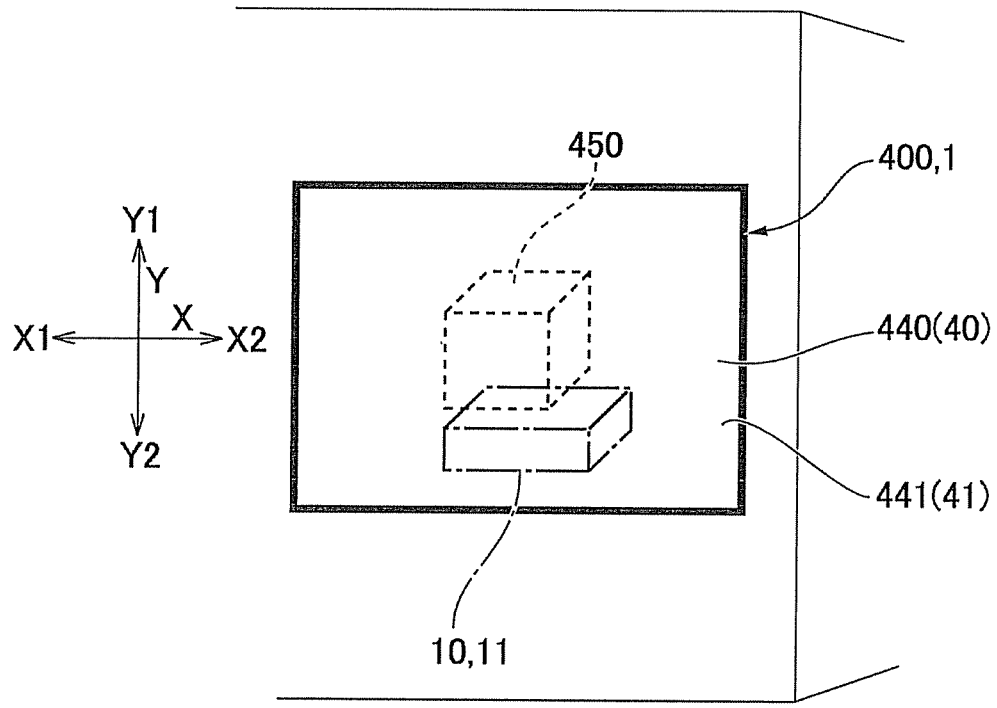
FIGS. 17A and 17B are explanatory views of a window having another position detection function (an appliance having a position detection function) to which the invention is applied.
Figure 17B:
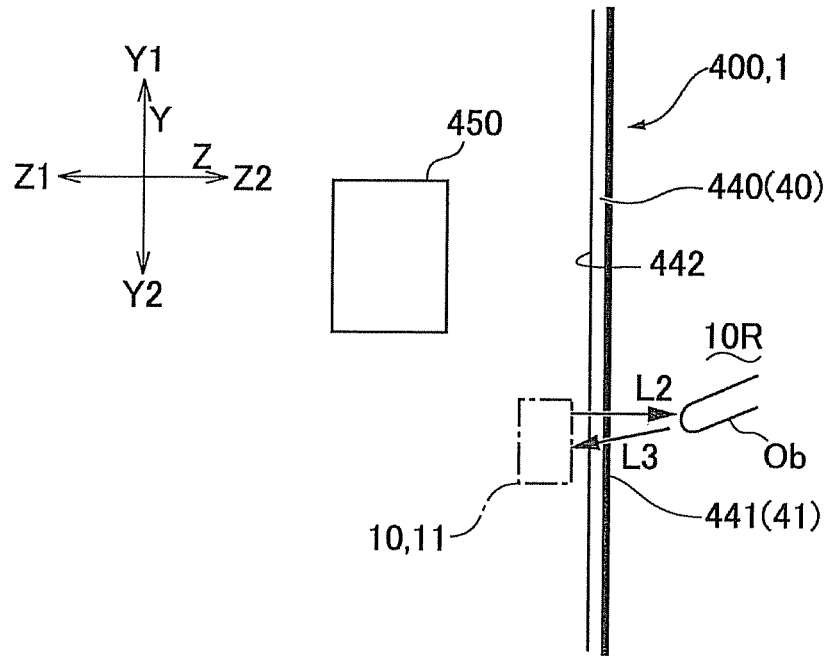

FIGS. 17A and 17B are explanatory views of a window (an appliance 1 having a position detection function) having a position detection function to which the invention is applied, in which FIG. 17A is an explanatory view schematically illustrating a window having the position detection function as seen from the outside (visible surface side), and FIG. 17B is an explanatory view schematically illustrating the cross section of the window. In the window having the position detection function in this embodiment, since the configuration of the optical position detection apparatus 10 is the same as that as described above with reference to FIGS. 1A to 7B, the same reference numerals are used for the common portions, and the description thereof will be omitted.

The window 400 having the position detection function as illustrated in FIGS. 17A and 17B includes a transmission member 440 (visible surface configuration member 40) that covers the exhibit 450 as information, and visible surface (visible surface 41) of the exhibit 450 is configured by the outer surface 441 of the transmission unit 440. Further, in the window 400 having the position detection function, the exhibit 450 is maintained on an actuator (not illustrated) that makes the exhibit 450 perform an operation such as forward movement and swing.

The window 400 having the position detection function as described above is provided with the optical unit 11 of the optical position detection apparatus 10 as described above with reference to FIGS. 1A to 7B on the side of the inner surface 442 of the transmission member 440, and the optical unit 11 emits the detection light L2 from the inner side of the transmission member 440 to the side of the outer surface 441 (visible surface 41) of the transmission member 440. Further, the optical unit 11 detects the detection light L3 that is reflected by the target object Ob and passes through the transmission member 440.

In the window 400 having the position detection function as described above, the detection space 10R of the optical position detection apparatus 10 is installed on the side of the outer surface 441 of the transmission member 440. Accordingly, by advancing the target object Ob such as a finger end or the like to the detection space 10R, the position of the target object Ob can be used as input information such as instruction for changing the direction of the exhibit 450. For example, if the target object Ob such as the finger end or the like moves downward, the exhibit 450 advances the transmission member 440, while if the target object Ob such as the finger end or the like moves to the right, the direction of the exhibit 450, such as swing the exhibit 450 to the right, can be changed.

Figure 18A:
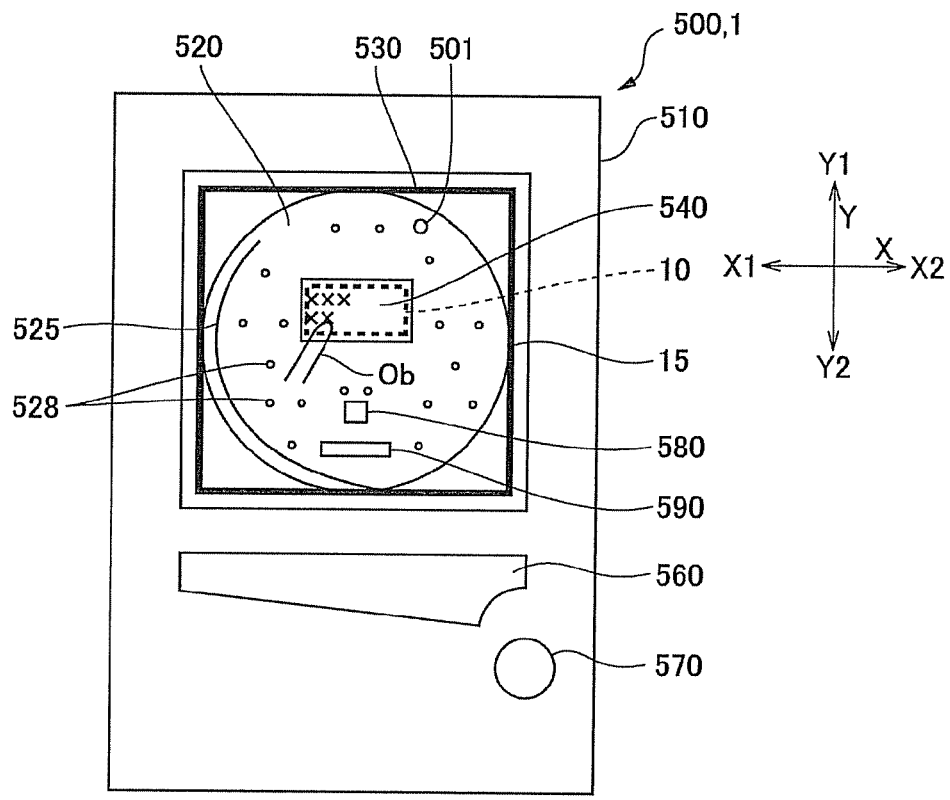
FIGS. 18A and 18B are explanatory views of an amusement device having another position detection function (an appliance having a position detection function) to which the invention is applied.
Figure 18B:
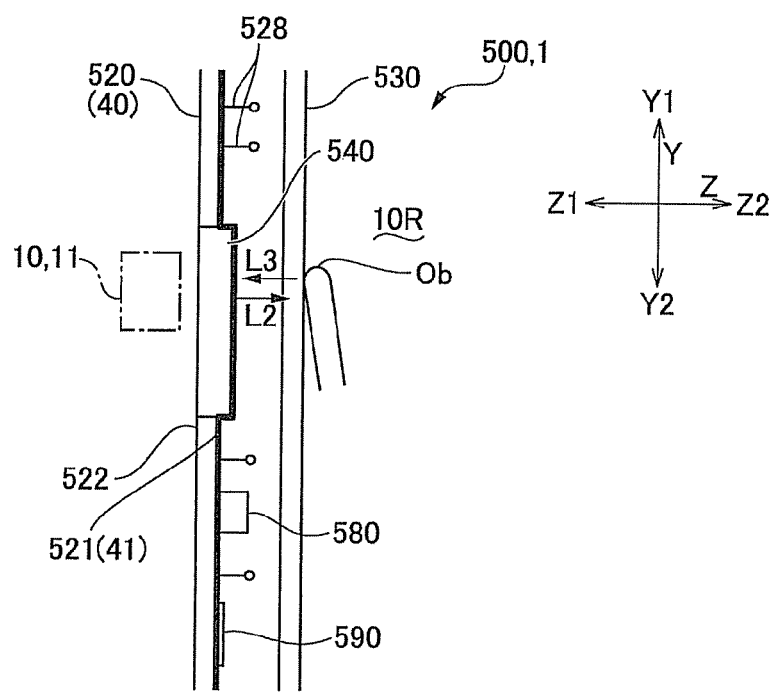

Configuration Example of an Amusement Appliance Having a Position Detection Function FIGS. 18A and 18B are explanatory views of an amusement appliance having another position detection function (an appliance 1 having a position detection function) to which the invention is applied, in which FIG. 18A is an explanatory view schematically illustrating an amusement appliance having the position detection function as seen from the front portion (visible surface side), and FIG. 18B is an explanatory view schematically illustrating the cross section thereof. In the amusement appliance having the position detection function in this embodiment, since the configuration of the optical position detection apparatus 10 is the same as that as described above with reference to FIGS. 1A to 7B, the same reference numerals are used for the common portions, and the description thereof will be omitted.

The amusement appliance 500 having the position detection function as illustrated in FIGS. 18A and 18B includes a plate-shaped base 520 (visible surface configuration member 40) that supports a medium for a game 501 such as pachinko glass beads, an outer frame 510 for maintaining the base 520, a handle 570 for setting a position or the like in which the game medium 501 is output onto the base 520, and a saucer 560 for receiving the game medium 501. The surface 521 (visible surface 41) of the base 520 is covered by a glass plate 530, and inside the glass plate 530 on the surface 521 of the base 520, a guide rail 525 for the game medium 501, a nail 528 for changing the movement of the game medium 501, and winning openings 580 and 590 are provided. Further, inside the glass plate 530 on the surface 521 of the base 520, an image generation device 540 for displaying the result of the lottery that is performed whenever the game medium 501 enters into the winning opening 580.

In the amusement appliance 500 having the position detection function, the optical unit 11 of the optical position detection apparatus 10 described with reference to FIGS. 1A to 7B is installed on the back surface 522 of the base 520, and the optical unit 11 emits the detection light L2 from the side of the back surface 522 of the base 520 to the detection space 10R set on the side of the surface 452 (visible surface 41). Further, the optical unit 11 detects the detection light L3 that is reflected by the target object Ob and passes through the transmission member 440.

In arranging the optical position detection apparatus 10 as described above, in this embodiment, the image generation device 540 is configured as the direct-view display device 100 having the position detection function as described above with reference to FIG. 15. That is, the optical unit 11 is installed on the back surface side of the image generation device 540. Due to this, in the amusement appliance 500 having the position detection function in this embodiment, the detection space 10R is set in a region that overlaps the image generation device 540 of the side of the surface 452 (the side of the visible surface 41) of the base 520. Further, in this embodiment, the outer surface side of the glass plate 530 is considered as the detection space 10R, and the position of the target object Ob that is positioned in the detection space 10R is detected.

Accordingly, if a gamer advances the target object Ob such as a finger end or the like to the detection space 10R to match the contents displayed on the image generation device 540 or the progress of the game, the position of the target object Ob can be used as input information such as instruction for changing the contents displayed on the image generation device 540.

When the amusement appliance 500 is configured such that the base 520 is transmissive to the detection light L2 composed of an infrared light, a region overlapping with the base 520 can be made a detection space 10R. Also, when the base 520 is configured such that the region thereof overlapping with the light source unit 12 of the optical unit 11 and the light receiving unit 30 is transmissive to the detection light L2 composed of an infrared light, a region overlapping with the base 520 can be made a detection space 10R.

The entire disclosure of Japanese Patent Application No. 2010-175121, filed Aug. 4, 2010 is expressly incorporated by reference herein.

What is claimed is:

1. An optical position detection apparatus optically detecting a position of a target object, comprising:
   a screen that is in a quadrangle shape having first through fourth sides, the target object being located next to the screen;
   a first light source unit that is located spaced apart from the first side of the screen and adjacent to one edge of the first side of the screen, the first light source unit emits a first detection light along the screen in a first direction;
   a second light source unit that is located spaced apart from the first side of the screen and adjacent to the other edge of the first side of the screen, the second light source unit emits a second detection light along the screen in the first direction, the first and second light source units being coaxially aligned parallel to the first side of the screen;
   a third light source unit that is located spaced apart from the first side of the screen and adjacent to the first light source unit, the third light source unit emits a third detection light along the screen in the first direction, the third light source unit being spaced further apart from the first side of the screen in the first direction than the first light source unit;
   a light receiving unit that is located spaced apart from the first side of the screen and adjacent to a center of the first side of the screen, the light receiving unit receives first through third reflected lights that result from respectively reflecting the first through third detection lights off the target object;
   a light source drive unit that alternatively drives the first light source unit, the second light source unit, and the third light source unit; and
   a position detection unit that detects the position of the target object first through third reflected lights that are received by the light receiving unit, wherein
   the light source drive unit sequentially turns the first and second light source units on and off to sequentially emit the first and second detection lights, and
   the light source drive unit sequentially turns the first and third light source units on and off to sequentially emit the first and third detection lights.

2. The optical position detection apparatus according to claim 1, wherein the third light source unit is positioned within a plane in which the first light source unit and the second light source unit exist, and the plane is parallel to the screen.

3. The optical position detection apparatus according to claim 1, wherein
   the light source drive unit sequentially turns a group of the first and second light source units and the third light source unit on and off to sequentially emit a group of the first and second detection lights and the third detection light, and the first and second light source units are turned ON with equal luminance.

4. The optical position detection apparatus according to claim 1, further comprising a fourth light source unit
   that is located spaced apart from the first side of the screen and adjacent to the second light source unit, the fourth light source unit emits a fourth detection light along the screen in the first direction, the fourth light source unit being spaced further apart from the first side of the screen in the first direction than the second light source unit, wherein
   the light source drive unit simultaneously drives the third and fourth light source units so that the third and fourth light source units are turned ON with equal luminance.

5. The optical position detection apparatus according to claim 1, wherein
   when the light source drive unit drives the first and second light source units, the light source drive unit controls the first and second reflected lights so that an intensity of the first and second reflected lights is the same, and
   when the light source drive unit drives the first and third light source units, the light source drive unit controls the first and third reflected lights so that an intensity of the first and third reflected lights is the same.

6. The optical position detection apparatus according to claim 1, further comprising a reference light source unit which emits a reference light that is directly incident to the light receiving unit, wherein
   when the light source drive unit drives the first and second light source units and the reference light source unit, the light source drive unit controls the first and second reflected lights and the reference light so that an intensity of the first and second reflected lights and the reference light is the same, and
   when the light source drive unit drives the first and third light source units and the reference light source unit, the light source drive unit controls the first and third reflected lights and the reference light so that an intensity of the first and third reflected lights and the reference light is the same.

7. An appliance having a position detection function, comprising an optical position detection apparatus described in claim 1 and a visible surface configuration member having a visible surface,
   wherein the first through third detection lights are emitted along the visible surface.

8. An appliance having a position detection function, comprising an optical position detection apparatus described in claim 2 and a visible surface configuration member having a visible surface,
   wherein the first through third detection lights are emitted along the visible surface.

9. An appliance having a position detection function, comprising an optical position detection apparatus described in claim 3 and a visible surface configuration member having a visible surface,
   wherein the first through third detection lights are emitted along the visible surface.

10. An appliance having a position detection function, comprising an optical position detection apparatus described in claim 4 and a visible surface configuration member having a visible surface,
    wherein the first through fourth detection lights are emitted along the visible surface.

11. An appliance having a position detection function, comprising an optical position detection apparatus described in claim 5 and a visible surface configuration member having a visible surface,
    wherein the first through third detection lights are emitted along the visible surface.

12. An appliance having a position detection function, comprising an optical position detection apparatus described in claim 1 and a visible surface configuration member having a visible surface,
    wherein the first through third detection lights are emitted to pass through the visible surface.

13. An appliance having a position detection function, comprising an optical position detection apparatus described in claim 2 and a visible surface configuration member having a visible surface, wherein the first through third detection lights are emitted to pass through the visible surface.

14. An appliance having a position detection function, comprising an optical position detection apparatus described in claim 3 and a visible surface configuration member having a visible surface,
wherein the first through third detection lights are emitted to pass through the visible surface.

15. An appliance having a position detection function, comprising an optical position detection apparatus described in claim 4 and a visible surface configuration member having a visible surface,
wherein the first through fourth detection lights are emitted to pass through the visible surface.

16. An appliance having a position detection function, comprising an optical position detection apparatus described in claim 5 and a visible surface configuration member having a visible surface,
wherein the first through third detection lights are emitted to pass through the visible surface.

* * * * *